United States Patent

Uchibori

(10) Patent No.: US 12,380,181 B2
(45) Date of Patent: Aug. 5, 2025

(54) INFORMATION PROCESSING APPARATUS, INFORMATION PROCESSING SYSTEM, AND METHOD OF PROCESSING INFORMATION

(71) Applicant: Ricoh Company, Ltd., Tokyo (JP)

(72) Inventor: Hiroki Uchibori, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/098,737

(22) Filed: Jan. 19, 2023

(65) Prior Publication Data

US 2023/0153400 A1 May 18, 2023

Related U.S. Application Data

(63) Continuation of application No. 16/210,020, filed on Dec. 5, 2018, now Pat. No. 11,593,460.

(30) Foreign Application Priority Data

Dec. 18, 2017 (JP) .................. 2017-242180

(51) Int. Cl.
*G06F 21/10* (2013.01)
*G06F 3/12* (2006.01)
*H04N 1/00* (2006.01)

(52) U.S. Cl.
CPC .......... *G06F 21/105* (2013.01); *G06F 3/1203* (2013.01); *G06F 3/1231* (2013.01);
(Continued)

(58) Field of Classification Search
CPC .......... G06F 21/10–109; G06F 3/1203; G06F 3/1231; G06F 3/1232; H04N 1/00411; H04N 1/0097; H04N 2201/0094
See application file for complete search history.

(56) References Cited

U.S. PATENT DOCUMENTS

2008/0209569 A1 8/2008 Araki
2009/0038018 A1* 2/2009 Mikami .................. G06F 21/10
726/27

(Continued)

FOREIGN PATENT DOCUMENTS

EP 1965330 A2 9/2008
EP 2966584 A1 1/2016
(Continued)

OTHER PUBLICATIONS

Extended European Search Report issued Apr. 15, 2019 in corresponding European Patent Application No. 18211719.2, 7 pages.
(Continued)

*Primary Examiner* — Madhuri R Herzog
(74) *Attorney, Agent, or Firm* — XSENSUS LLP

(57) ABSTRACT

An information processing apparatus connectable with a terminal via a network to manage a license of a package including applications assignable to a device includes circuitry configured to display a first screen for displaying a device list, the license of the package being assignable to and cancellable from the device in response to receiving a first request, receive a selection of a specific device in the device list and any one of an operation of assigning and cancelling the license of the package, assign the license of the package to the selected specific device in response to receiving the selection of the specific device and the operation of assigning the license of the package, and cancel the license of the package from the selected specific device in response to receiving the selection of the specific device and the operation of cancelling the license of the package.

14 Claims, 24 Drawing Sheets

(52) U.S. Cl.
CPC ............ *G06F 3/1232* (2013.01); *G06F 21/10* (2013.01); *H04N 1/00411* (2013.01); *H04N 1/0097* (2013.01); *H04N 2201/0094* (2013.01)

(56) References Cited

U.S. PATENT DOCUMENTS

| | | |
|---|---|---|
| 2009/0282146 A1 | 11/2009 | Nakano |
| 2010/0071069 A1 | 3/2010 | Sugiura et al. |
| 2010/0242117 A1 | 9/2010 | Tsuboi |
| 2011/0066886 A1 | 3/2011 | Sugiura et al. |
| 2011/0066972 A1 | 3/2011 | Sugiura |
| 2011/0321172 A1 | 12/2011 | Maeda et al. |
| 2012/0030673 A1 | 2/2012 | Sakamoto |
| 2012/0127525 A1 | 5/2012 | Uchibori et al. |
| 2012/0127527 A1 | 5/2012 | Nakabayashi et al. |
| 2013/0063761 A1 | 3/2013 | Uchibori et al. |
| 2013/0067463 A1 | 3/2013 | Ito |
| 2013/0254903 A1 | 9/2013 | Araki |
| 2013/0314732 A1 | 11/2013 | Nakabayashi et al. |
| 2014/0082609 A1 | 3/2014 | Ono |
| 2014/0223570 A1 | 8/2014 | Matsushima et al. |
| 2015/0222776 A1 | 8/2015 | Uchibori et al. |
| 2015/0264212 A1 | 9/2015 | Uchibori |
| 2016/0012210 A1 | 1/2016 | Takemoto et al. |
| 2016/0125174 A1 | 5/2016 | Matsushima |
| 2016/0210709 A1 | 7/2016 | Uchida |
| 2016/0381243 A1 | 12/2016 | Manabe et al. |
| 2017/0034384 A1 | 2/2017 | Uchibori |
| 2018/0039453 A1* | 2/2018 | Nakajima ............... G06F 3/1222 |
| 2018/0101666 A1* | 4/2018 | Nakatani ............... G06F 21/126 |
| 2018/0109688 A1 | 4/2018 | Uchibori et al. |

FOREIGN PATENT DOCUMENTS

| | | | |
|---|---|---|---|
| JP | 2011-60237 A | | 3/2011 |
| JP | 2011-253417 A | | 12/2011 |
| JP | 2014-170522 A | | 9/2014 |
| JP | 2015-95051 A | | 5/2015 |
| JP | 2017049707 A | * | 3/2017 |
| JP | 2017-83982 A | | 5/2017 |

OTHER PUBLICATIONS

Japanese Office Action issued Jul. 6, 2021, in corresponding Japanese Patent Application No. 2017-242180.

* cited by examiner

FIG. 6

| PACKAGE ID | PACKAGE NAME | PACKAGE DESCRIPTION | SERVICE ID | APPLICATION ID LIST | ... |
|---|---|---|---|---|---|
| P001 | STORAGE A PACKAGE | ... | S11111 | APP001,APP002,... | ... |
| P002 | STORAGE B PACKAGE | ... | S22222 | APP101,APP102,... | ... |
| P002 | STORAGE C PACKAGE | ... | S33333 | APP201,APP202,... | ... |
| ... | ... | ... | ... | ... | ... |

120

PACKAGE INFORMATION (SERVICE ID, APPLICATION ID LIST, ...)

FIG. 7

| APPLICATION ID | APPLICATION NAME | APPLICATION DESCRIPTION | CREATION DATE | DEVELOPER INFORMATION | ... |
|---|---|---|---|---|---|
| APP001 | Scan to Email | ... | APR.5, 2017 | ... | ... |
| APP002 | Scan to Me | ... | APR.5, 2017 | ... | ... |
| APP003 | Scan to Me STORAGE A | ... | APR.5, 2017 | ... | ... |
| ... | ... | ... | ... | ... | ... |

130

APPLICATION INFORMATION

FIG. 8

| APPLICATION SETTING ID | APPLICATION ID | DEFAULT SETTING | ... | |
|---|---|---|---|---|
| SET001 | APP001 | RESOLUTION=300dpi, ... | ... | APPLICATION SETTING INFORMATION |
| SET002 | APP002 | ... | ... | |
| SET003 | APP003 | ... | ... | |
| ... | ... | ... | ... | |

| SERVICE ID | SERVICE NAME | SERVICE DESCRIPTION | SERVICE TYPE | |
|---|---|---|---|---|
| S11111 | STORAGE A ASSOCIATED SERVICE | ... | CLOUD SERVICE | ... |
| S22222 | STORAGE B ASSOCIATED SERVICE | ... | CLOUD SERVICE | ... |
| S33333 | STORAGE C ASSOCIATED SERVICE | ... | CLOUD SERVICE | ... |
| ... | ... | ... | ... | ... |

150

SERVICE INFORMATION (SERVICE DESCRIPTION, SERVICE TYPE, ...)

FIG. 10

| LICENSE ID | LICENSE NAME | TENANT ID | USE START DATE | SCHEDULED TERMINATION DATE | TERMINATION DATE | STATUS | NUMBER OF ALLOWABLE DEVICES | IN-USE DEVICE ID | SERVICE ID | ... |
|---|---|---|---|---|---|---|---|---|---|---|
| L12345 | LICENSE A | T001 | AUG.8, 2017 | AUG.7, 2018 | | IN USE | 10 | D001,D003 | S11111 | ... |
| L12346 | LICENSE B | T002 | JULY 15, 2016 | JULY 14, 2017 | JULY 14, 2017 | TERMINATED | — | — | S22222 | ... |
| L12347 | LICENSE B | T003 | JULY 15, 2017 | JULY 14, 2018 | | IN USE | 15 | D101,D102,... | S22222 | ... |
| ... | ... | ... | ... | ... | ... | ... | ... | ... | ... | ... |

160

LICENSE INFORMATION (covers last columns)

| DEVICE ID | DEVICE DESCRIPTION | TENANT ID | REGISTRATION DATE | ... | |
|---|---|---|---|---|---|
| D001 | ... | T001 | OCT. 1, 2016 | ... | ⎫ DEVICE INFORMATION |
| D002 | ... | T001 | APR. 1, 2016 | ... | |
| D003 | ... | T001 | APR. 1, 2016 | ... | |
| ... | ... | ... | ... | ... | |

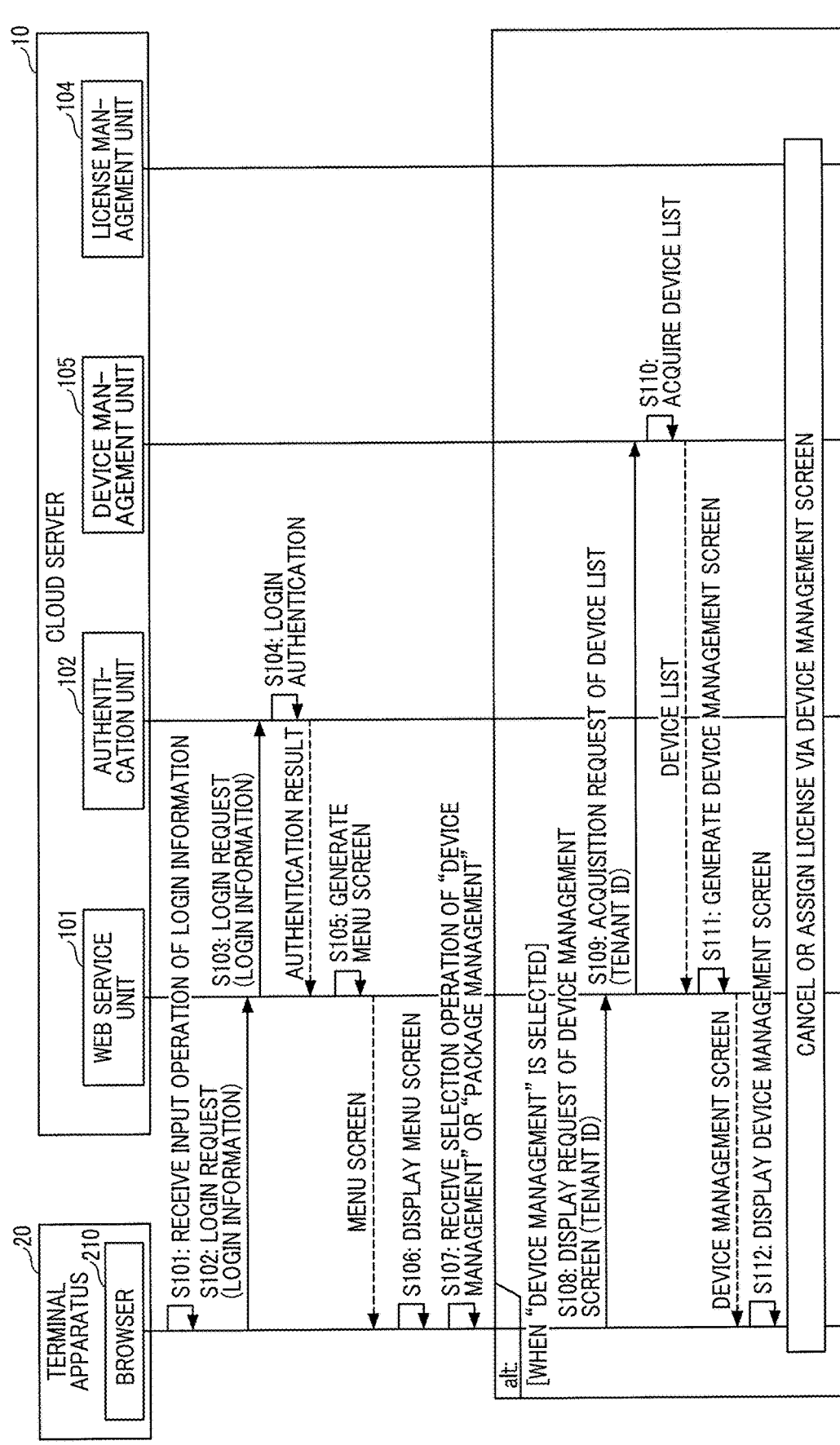

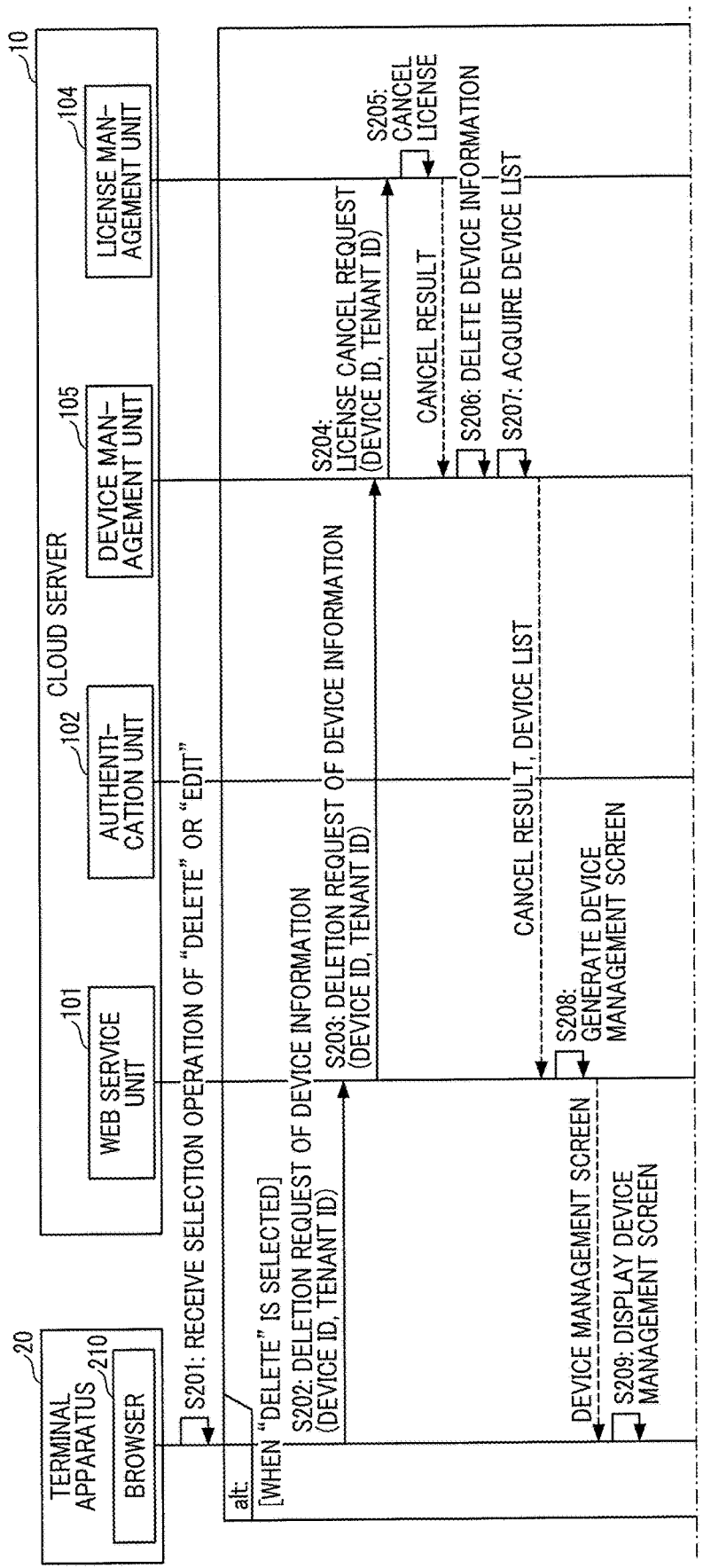

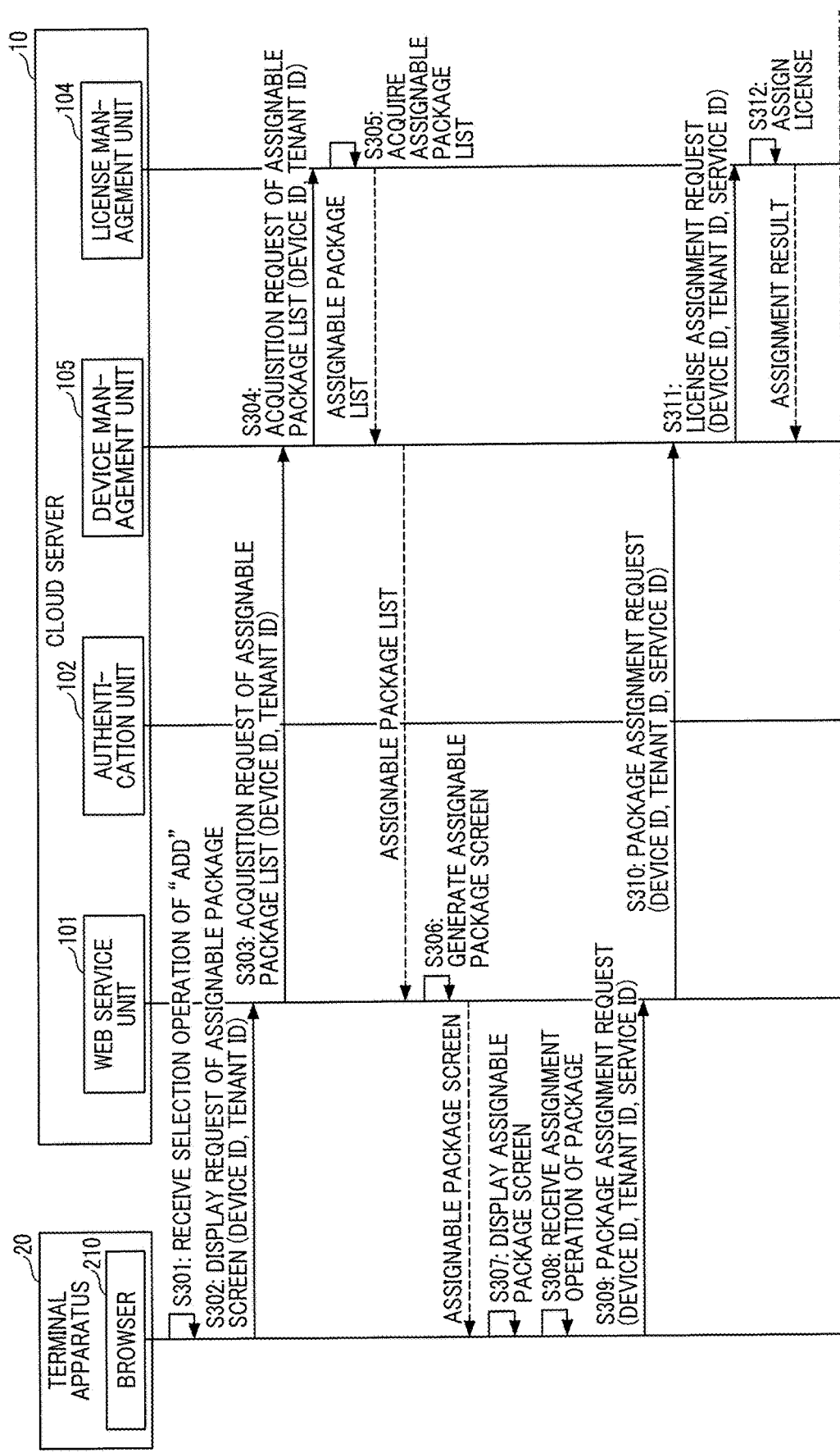

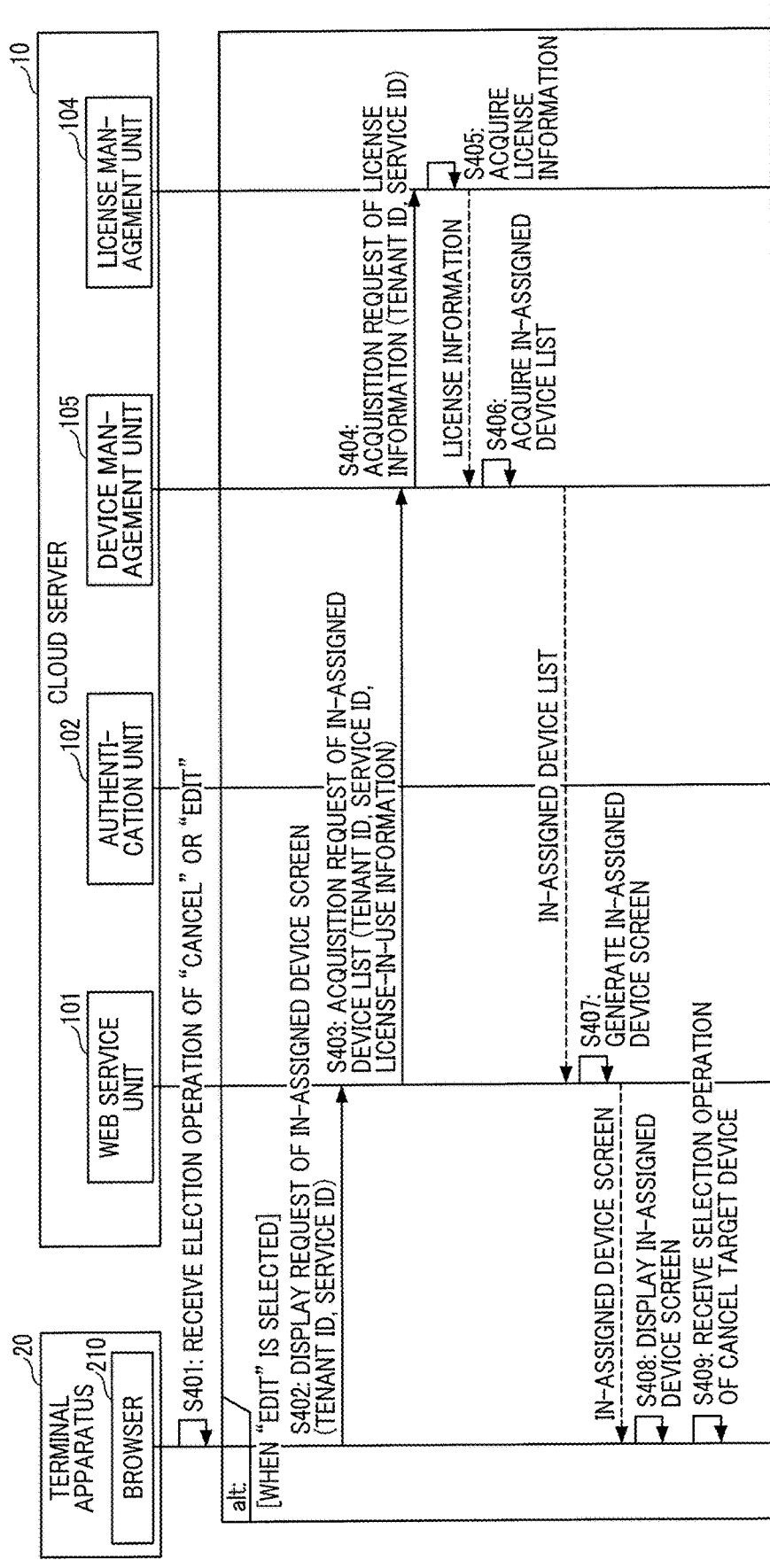
FIG. 18A  FIG. 18 | FIG. 18A | FIG. 18B    CANCELLING LICENSE FROM PACKAGE MANAGEMENT SCREEN

INFORMATION PROCESSING APPARATUS, INFORMATION PROCESSING SYSTEM, AND METHOD OF PROCESSING INFORMATION

CROSS-REFERENCE TO RELATED APPLICATIONS

This application is a continuation of U.S. patent application Ser. No. 16/210,020, filed on Dec. 5, 2018, which claims priority pursuant to 35 U.S.C. § 119(a) to Japanese Patent Application No. 2017-242180, filed on Dec. 18, 2017 in the Japan Patent Office, the disclosure of each of which is incorporated by reference herein in its entirety.

BACKGROUND

Technical Field

This disclosure relates to an information processing apparatus, an information processing system, and a method of processing information.

Background Art

With advances in technologies such as cloud computing, a wide variety of applications have been provided as cloud services to devices such as multifunction peripherals (MFPs). For example, an application for storing an image file scanned by a multifunction machine into an external storage, an application for printing an electronic file downloaded from an external storage, and an application for printing an electronic file downloaded from an external storage are provided as the cloud services. Such applications can be utilized, for example, when a license for using an application is assigned to each device.

Further, when a replacement of an image forming apparatus is to be performed after starting a license agreement, a renewed license can be issued to a new image forming apparatus replacing the older image forming apparatus.

However, in conventional technologies, users are required to input identification information (e.g., serial number) of image forming apparatuses to be replaced. Therefore, the users are required to operate each image forming apparatus to display a serial number of each image forming apparatus, or to check, for example, a seal having a serial number attached to each image forming apparatus to be replaced. Therefore, a workload increases as it is necessary to manage the license in an event of replacing the image forming apparatuses.

SUMMARY

As one aspect of the present invention, an information processing apparatus is devised. The information processing apparatus is connectable with a terminal via a network to manage a license of a package including one or more applications assignable to a device. The information processing apparatus includes circuitry configured to display, on the terminal, a first screen for displaying a device list including one or more devices, the license of the package being assignable to each of the devices and cancellable from each of the devices, in response to receiving a first request from the terminal, receive, from the terminal, a selection of a specific device from the one or more devices included in the device list displayed on the first screen and any one of an operation of assigning the license of the package and an operation of cancelling the license of the package, assign the license of the package to the specific device selected from the device list in response to receiving the selection of the specific device and the operation of assigning the license of the package from the terminal, and cancel the license of the package from the specific device selected from the device list in response to receiving the selection of the specific device and the operation of cancelling the license of the package from the terminal.

As another aspect of the present invention, an information processing system is devised. The information processing system manages a license of a package including one or more applications assignable to a device connectable with a terminal via a network. The information processing system includes circuitry configured to display, on the terminal, a first screen for displaying a device list including one or more devices, the license of the package being assignable to each of the devices and cancellable from each of the devices, in response to receiving a first request from the terminal, receive, from the terminal, a selection of a specific device from the one or more devices included in the device list displayed on the first screen and any one of an operation of assigning the license of the package and an operation of cancelling the license of the package, assign the license of the package to the specific device selected from the device list in response to receiving the selection of the specific device and the operation of assigning the license of the package from the terminal, and cancel the license of the package from the specific device selected from the device list in response to receiving the selection of the specific device and the operation of cancelling the license of the package from the terminal.

As another aspect of the present invention, a method of managing a license of a package including one or more applications assignable to a device connectable with a terminal via a network is devised. The method includes displaying, on the terminal, a first screen for displaying a device list including one or more devices, the license of the package being assignable to each of the devices and cancellable from each of the devices in response to receiving a first request from the terminal, receiving, from the terminal, a selection of a specific device selected from the device list displayed on the first screen and any one of an operation of assigning the license of the package and an operation of cancelling the license of the package, assigning the license of the package to the specific device selected from the device list in response to receiving the selection of the specific device and the operation of assigning the license of the package from the terminal, and cancelling the license of the package from the specific device selected from the device list in response to receiving the selection of the specific device and the operation of cancelling the license of the package from the terminal.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 6 illustrates an example of package information;

FIG. 7 illustrates an example of application information;

FIG. 8 illustrates an example of application setting information;

FIG. 9 illustrates an example of service information;

FIG. 10 illustrates an example of license information.

FIG. 11 illustrates an example of device information;

FIGS. 12A and 12B (FIG. 12) illustrate an example of a sequence diagram of a license management process;

FIGS. 14A and 14B (FIG. 14) illustrate an example of a sequence diagram of a process of cancelling a license from a device management screen;

FIGS. 16A and 16B (FIG. 16) illustrate an example of a sequence diagram of a process of assigning a license from a device management screen;

FIGS. 18A and 18B (FIG. 18) illustrate an example of a sequence diagram of a process of cancelling a license from a package management screen;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an embodiment of the present invention in detail with reference to the drawings.

Figure 1:
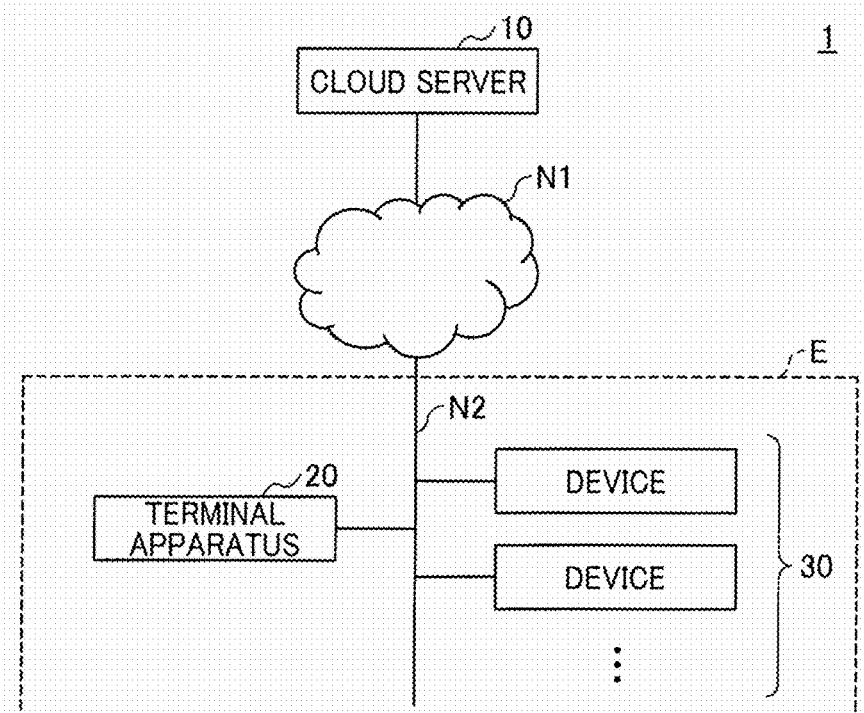
FIG. 1 illustrates an example of a configuration of a cloud system according to an embodiment.

System Configuration:

Hereinafter, a description is given of a configuration of a cloud system 1 according to an embodiment with reference to FIG. 1. FIG. 1 illustrates an example of a configuration of the cloud system 1 according to the embodiment.

As illustrated in FIG. 1, the cloud system 1 includes, for example, a cloud server 10, a terminal apparatus 20, and one or more devices 30. For example, the terminal apparatus 20 and one or more devices 30 are disposed in a system environment E of a user who uses the one or more devices 30, in which the terminal apparatus 20 and one or more devices 30 are connected to each other via a second network N2, such as a local area network (LAN). The cloud server 10 and the system environment E are communicably connected with each other via a first network N1, such as the Internet. The first network N1 and the second network N2 are each implemented by either wired or wireless network, or the first network N1 and the second network N2 are each implemented by a combination of wired and wireless networks.

The cloud server 10 is an example of an information processing apparatus or computer that provides one or more cloud-based applications to the device 30 via the first network N1. Hereinafter, each of the cloud-based applications is referred to as a "cloud application" or simply "an application."

The cloud application includes, for example, an application for storing image data generated by the device 30, such as a multifunction peripheral (MFP), and an application for printing an electronic file acquired from an external storage using the device 30.

The application provided by the cloud server 10 is described as the cloud application, but not limited thereto. For example, the application provided by the cloud server 10 can be, a web application, and an application provided by an application service provider (ASP).

Further, the cloud server 10 manages, for example, one or more applications to be provided to the device 30 and licenses of the applications.

The terminal apparatus 20 is an example of an information processing apparatus (e.g., computer) used by, for example, an administrator of the system environment E. The terminal apparatus 20 includes, for example, a personal computer (PC), a smart phone, a tablet terminal, and the like.

For example, the administrator of the system environment E can use the terminal apparatus 20 to perform the license management of application (e.g., assigning a license to the device 30 and cancelling or revoking a license assigned to the device 30). Therefore, when the device 30 is to be replaced, the administrator can use the terminal apparatus 20 to cancel the license assigned to the device 30 to be replaced with another device and to assign a license to the device 30 that replaces another device.

The device 30 is an example of an image forming apparatus, such as a multifunction peripheral (MFP). The device 30 can provide various services to a user by utilizing applications provided by the cloud server 10. The device 30 can use each application when the license is assigned to each application.

The configuration of the cloud system 1 illustrated in FIG. 1 is just one example, and other configurations can be used. For example, the cloud server 10 can be an information processing system (computer system) including a plurality of information processing apparatuses. Further, the system environment E can include a plurality of terminal apparatuses 20. Further, the device 30 is not limited to the multi-function peripheral (MFP), but can be, for example, a digital camera, a printing apparatus, a copier, a projector, a facsimile, an electronic conference terminal, an electronic information board apparatus, an audio device, an in-vehicle device (e.g., car navigation system), an electric home appliance (e.g., refrigerator), and the like.

Figure 2:
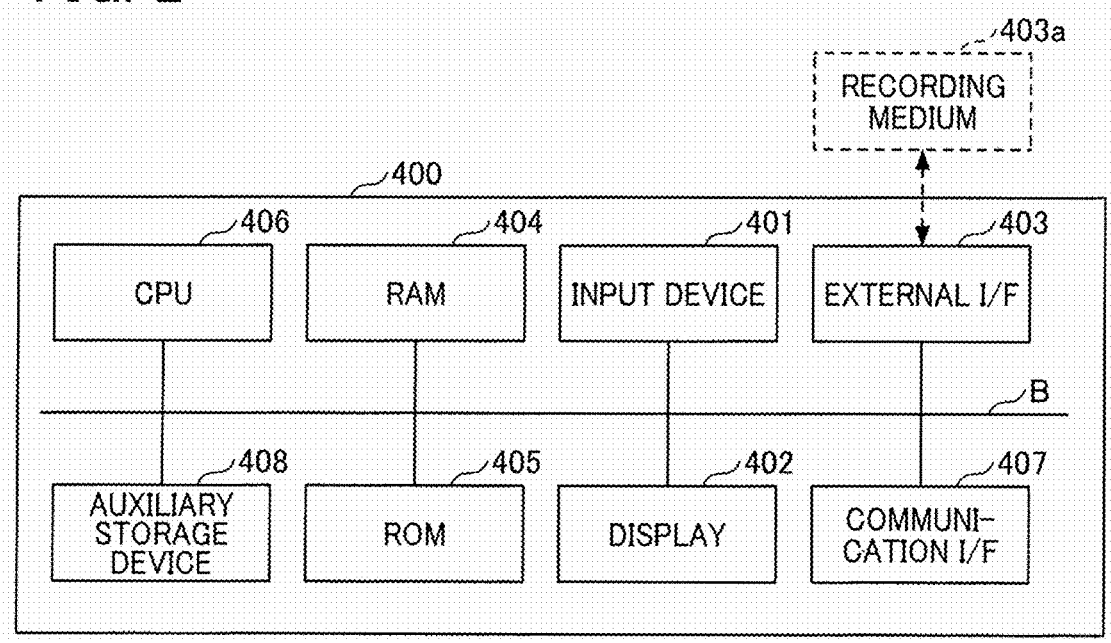
FIG. 2 illustrates an example of a hardware block diagram of a computer.

Hardware Configuration of Cloud Server and Terminal Apparatus:

Hereinafter, a description is given of a hardware configuration of the cloud server 10 and the terminal apparatus 20 according to the embodiment. One or more information processing apparatuses used as the cloud server 10, and the terminal apparatus 20 can be implemented by employing, for example, a computer 400 illustrated in FIG. 2. FIG. 2 illustrates an example of a hardware block diagram of the computer 400.

As illustrated in FIG. 2, the computer 400 includes, for example, an input device 401, a display 402, an external interface (I/F) 403, and a random access memory (RAM) 404. The computer 400 further includes, for example, a read only memory (ROM) 405, a central processing unit (CPU) 406, a communication interface (I/F) 407, and an auxiliary storage device 408. Each of these hardware components is connected with each other via bus B.

The input device 401 includes, for example, a keyboard, a mouse, a touch panel, and the like and is used by a user to input various operations. The display 402 includes, for example, a display device or the like and displays a result of processing performed by the computer 400. Further, the computer 400 may not include at least one of the input device 401 and the display 402.

The external I/F 403 is an interface to an external device. The external device includes, for example, a recording medium 403a and the like. The computer 400 can read data from the recording medium 403a and write data to the recording medium 403a via the external I/F 403. The recording medium 403a includes, for example, a flexible disk, a compact disk (CD), a digital versatile disc (DVD), a secure digital (SD) memory card, a universal serial bus (USB) memory, and the like.

The RAM 404 is a volatile semiconductor memory that temporarily stores or retains programs and data. The ROM 405 is a nonvolatile semiconductor memory capable of retaining programs and data even when a power supply is turned off. The ROM 405 stores programs and data, such as basic input/output system (BIOS), operating system (OS) settings, and network settings to be executed when the computer 400 is activated.

The CPU 406 is a computing device, such as circuitry and one or more processors, that reads out programs and data from a storage device such as the ROM 405 and the auxiliary storage device 408, loads programs and data onto the RAM 404 to perform processing to control the computer 400 entirely, and to implement functions of the computer 400.

The communication I/F 407 is an interface for connecting the computer 400 to the first network N1 and the second network N2. The computer 400 can perform data communication with other devices or the like via the communication I/F 407.

The auxiliary storage device 408 is, for example, a hard disk drive (HDD), a solid state drive (SSD), or the like, and is a nonvolatile storage device that stores programs and data. The programs and data stored in the auxiliary storage device 408 include an OS, which is the basic software for controlling the computer 400 entirely, and software that provides various functions on the OS. The auxiliary storage device 408 manages the stored programs and data based on a given file system, database (DB) or the like.

The one or more information processing apparatuses that implement the cloud server 10, and the terminal apparatus 20 employ the hardware configuration of the computer 400 illustrated in FIG. 2, with which various kinds of processing can be implemented to be described later.

Figure 3:
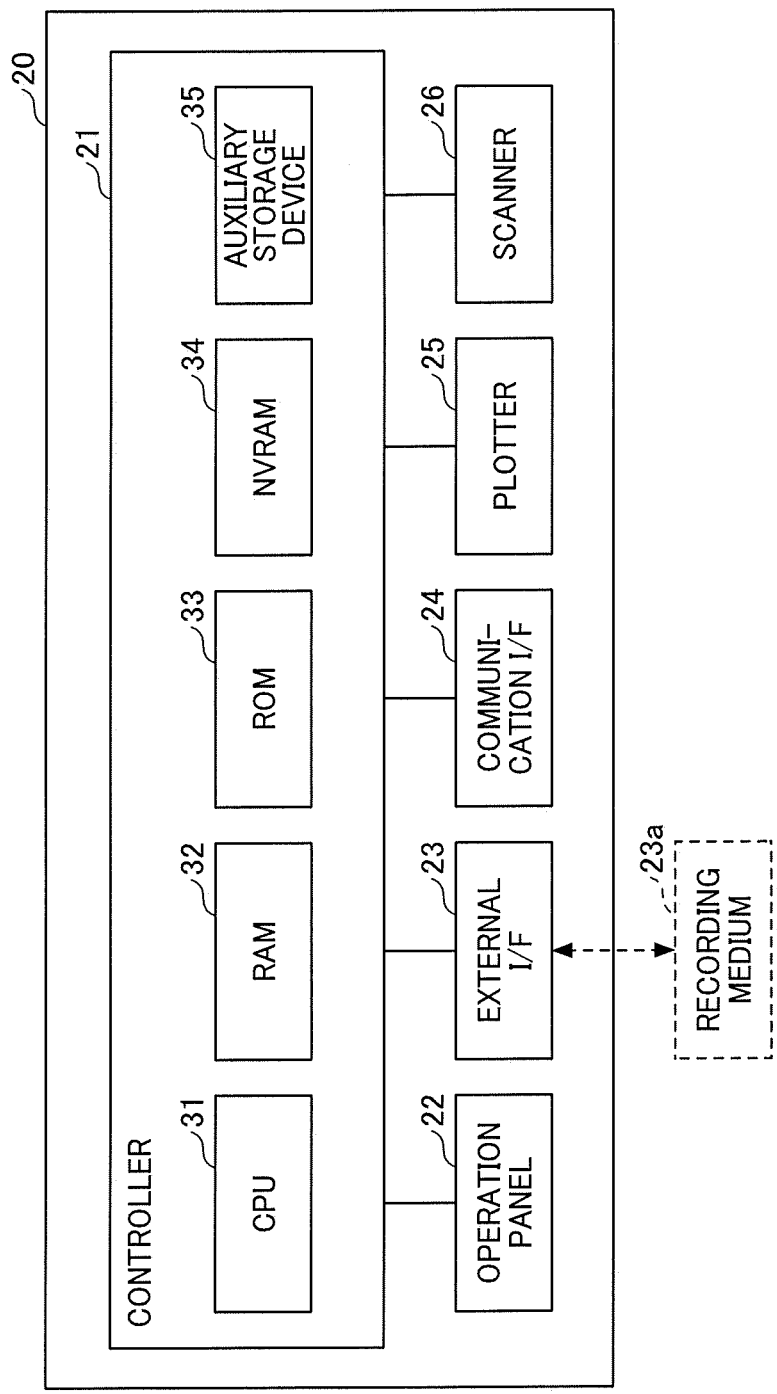
FIG. 3 illustrates an example of a hardware block diagram of a device used as an image forming apparatus.

Hardware Configuration of Device:

Hereinafter, a description is given of a hardware configuration of the device 30 used as the image forming apparatus with reference to FIG. 3. FIG. 3 illustrates an example of a hardware block diagram of the device 30 used as the image forming apparatus.

As illustrated in FIG. 3, the device 30 includes, for example, a controller 21, an operation panel 22, an external I/F 23, a communication I/F 24, a plotter 25, and a scanner 26. The controller 21 includes, for example, a CPU 31, a RAM 32, a ROM 33, a non-volatile random access memory (NVRAM) 34, and an auxiliary storage device 35.

The ROM 33 is a nonvolatile semiconductor memory capable of retaining programs and data even when a power supply is turned off. The RAM 32 is a volatile semiconductor memory that temporarily stores or retains programs and data. The NVRAM 34 is a nonvolatile semiconductor memory that stores, for example, setting information. Further, the auxiliary storage device 35 is, for example, HDD, SSD, or the like, and is a nonvolatile storage device that stores programs and data.

The CPU 31 is a computing device, such as circuitry and one or more processors, that reads out programs and data from a storage device such as the ROM 33, the NVRAM 34, and the auxiliary storage device 35, loads programs and data onto the RAM 32 to perform processing to control the device 30 entirely, and to implement functions of the device 30.

The operation panel 22 is an input/output device provided with an input/reception unit for receiving an input from a user and a display unit for displaying information. The external I/F 23 is an interface to an external device. The external device includes, for example, a recording medium 23a and the like. The device 30 can read data from the recording medium 23a and write data to the recording medium 23a via the external I/F 23.

The recording medium 23a includes, for example, an integrated circuit (IC) card, a flexible disk, a compact disk (CD), a digital versatile disc (DVD), a secure digital (SD) memory card, a universal serial bus (USB) memory, and the like.

The communication I/F 24 is an interface for connecting the device 30 to the second network N2. The device 30 can perform data communication with other devices or the like via the communication I/F 24.

The plotter 25 is a printing apparatus for printing print data on a print medium. The print medium is not limited to paper. The print medium can be, for example, an overhead projector (OHP) sheet, a plastic film, a copper foil, or the like. The scanner 26 is a reading device that scans or reads document to create image data.

The device 30 employs the hardware configuration illustrated in FIG. 3 to implement various processing to be described later.

Figure 4:
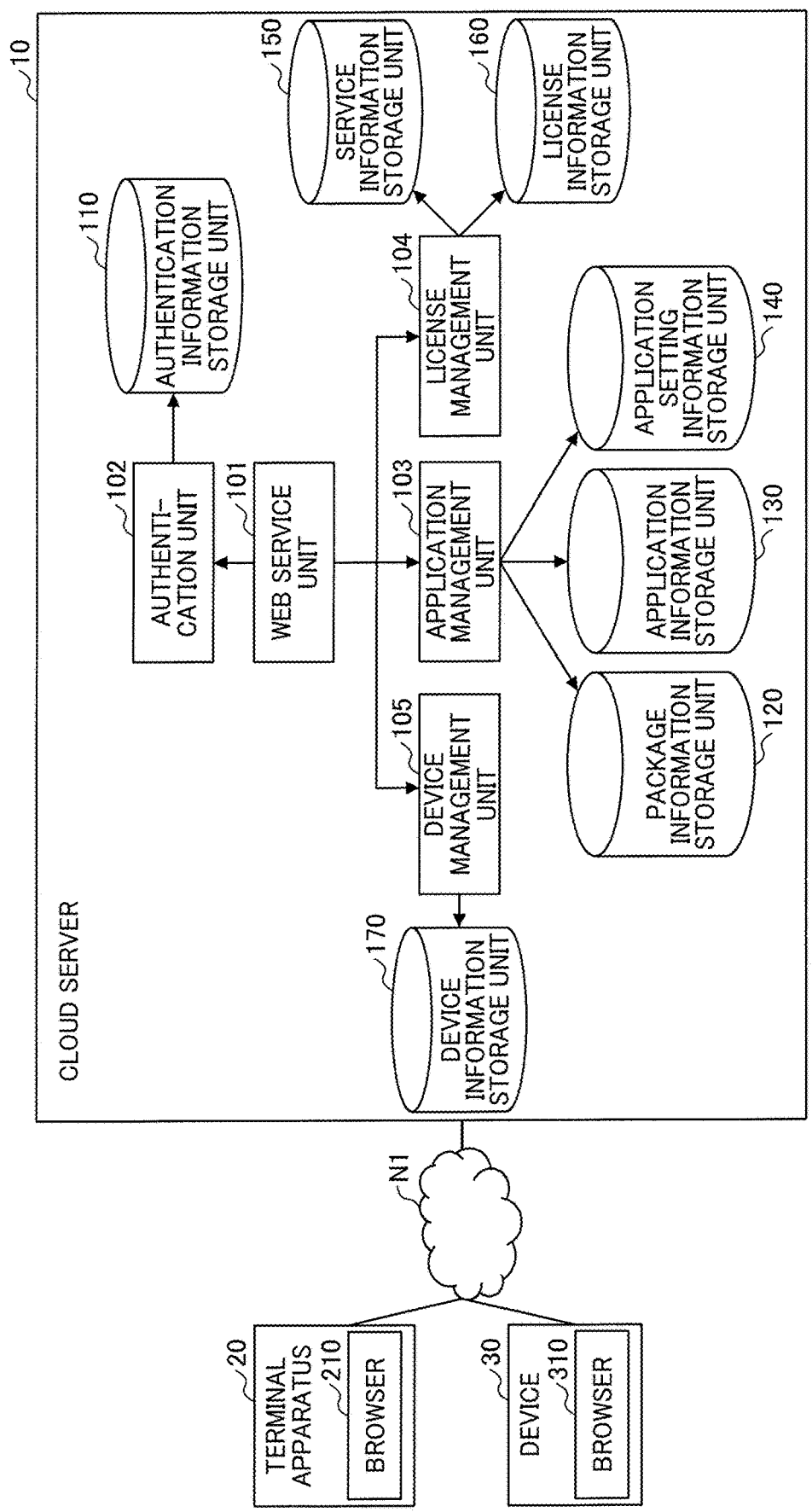
FIG. 4 illustrates an example of a functional block diagram of the cloud system of FIG. 1.

Functional Configuration of Cloud System:

Hereinafter, a description is given of a functional configuration of the cloud system 1 according to the embodiment with reference to FIG. 4. FIG. 4 illustrates an example of a functional block diagram of the cloud system 1 according to the embodiment.

Functional Configuration of Terminal Apparatus:

As illustrated in FIG. 4, the terminal apparatus 20 includes a web browser of general-purpose type (hereinafter, simply referred to as "browser 210"). A user (e.g., administrator of the system environment E) of the terminal apparatus 20 can perform the license management of each application using the browser 210.

Functional Configuration of Device:

As illustrated in FIG. 4, the device 30 includes a web browser of genera-purpose type (hereinafter simply referred to as "browser 310"). A user of the device 30 can use each application provided by the cloud server 10 using the browser 310.

Functional Configuration of Cloud Server:

As illustrated in FIG. 4, the cloud server 10 includes, for example, a web service unit 101, an authentication unit 102, an application management unit 103, a license management unit 104, and a device management unit 105. Each of these units is implemented by the CPU 406 when, for example, one or more programs installed on the cloud server 10 is executed by the CPU 406.

The cloud server 10 further includes, for example, an authentication information storage unit 110, a package information storage unit 120, an application information storage unit 130, an application setting information storage unit 140, a service information storage unit 150, a license information storage unit 160, and a device information storage unit 170. Each of these storage units can be implemented by using, for example, the auxiliary storage device 408. At least any one of these storage units can be implemented by using a storage device (e.g., database server) connected with cloud server 10 via the first network N1.

In response to various requests received from the browser 210 of the terminal apparatus 20, the web service unit 101 generates and returns various screens to be used by the user of the terminal apparatus 20 to perform the license management.

In response to a login request received from the browser 210 of the terminal apparatus 20, the authentication unit 102 refers to the authentication information stored in the authentication information storage unit 110 to perform a login authentication. The authentication information is information for performing the login authentication. For example, the authentication information is a combination of a user identification (ID) and a password used for logging in the cloud server 10.

The login request is a request by a user of the terminal apparatus 20 to log in the cloud server 10. By logging in the cloud server 10, the user of the terminal apparatus 20 can perform the license management of licenses managed by the cloud server 10.

The application management unit 103 manages package information stored in the package information storage unit 120, application information stored in the application information storage unit 130, and application setting information stored in the application setting information storage unit 140.

The package information is information indicating a package, which is a unit of sale of goods such as applications. One package includes, for example, one or more applications.

The application information is information indicating an application to be provided to the device 30. The application information includes, for example, a name of application, a description of application, and the like.

The application setting information is information indicating a default setting when the user of the device 30 uses an application. The application setting information includes, for example, default setting values of print setting, default setting values of scan setting, and the like.

The license management unit 104 manages service information stored in the service information storage unit 150 and license information stored in the license information storage unit 160.

The service information is information indicating a service to be introduced or installed by purchasing a package, or the like. The service information includes, for example, a service name, and a description of service.

The license information is information indicating a license set for each package unit assignable to each tenant. The license information includes, for example, identification information identifying a tenant (e.g., tenant ID) that purchases a package, and identification information identifying the device 30 (e.g., device ID) that can use the application included in the package.

The tenant means, for example, an organization or entity that purchases a package to use one or more applications. Specifically, the tenant includes, for example, company, department, section, group, team, and the like.

The device management unit 105 manages device information stored in the device information storage unit 170.

The device information is information indicating the device 30 registered in the cloud server 10. The device information includes, for example, identification information identifying the device 30, identification information identifying a tenant that owns and/or uses the device 30.

Further, if the cloud server 10 is configured using a plurality of information processing apparatuses, the web service unit 101, the authentication unit 102, the application management unit 103, the license management unit 104, and the device management unit 105 can be implemented by using different information processing apparatuses.

Figure 5:
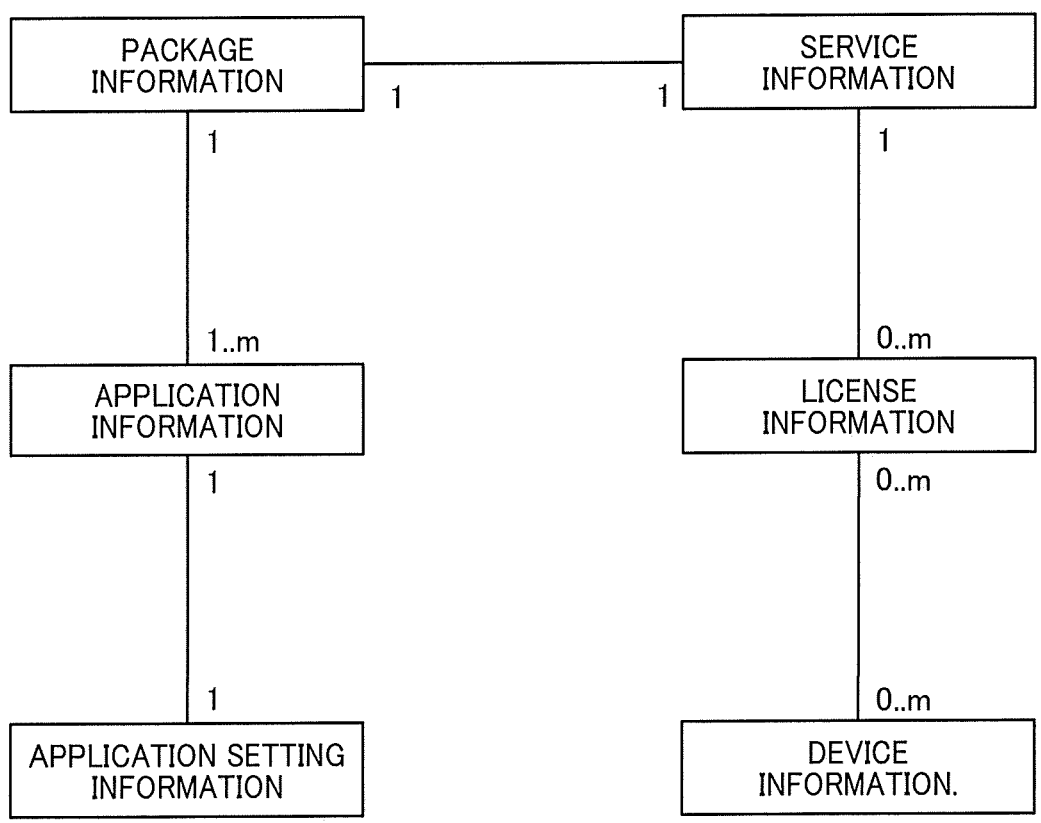
FIG. 5 illustrates an example of relationships between package information, application information, application setting information, service information, license information, and device information.

Hereinafter, a description is given of relationships between each information (package information, application information, application setting information, service information, license information, and device information) managed by the cloud server 10 with reference to FIG. 5. FIG. 5 illustrates an example of relationships between the package information, application information, application setting information, service information, license information, and device information.

As illustrated in FIG. 5, the package information and the application information have a relationship of one to one or many. This indicates that one package includes one or more applications. In FIG. 5, the package information is indicated by "1" and the application information is indicated by "1 . . . m."

Further, the application information and application setting information have a relationship of one to one. This indicates that there is one default setting for one application when using the one application. In FIG. 5, the application information is indicated by "1" and the application setting information is indicated by "1."

Further, the package information and the service information have a relationship of one to one. This indicates that one service is implemented by one or more applications included in one package. In FIG. 5, the package information is indicated by "1" and the service setting information is indicated by "1."

Further, the service information and the license information have a relationship of one to many, in which many means "zero or more." This indicates that when a tenant purchases one package including one or more applications for implementing one service, the number of licenses set for each application included in the one package for implementing the service can be zero and one or more including a case when the license expires a valid period or when the license does not exist. In FIG. 5, the service information is indicated by "1" and the license information is indicated by "0 . . . m."

Further, the license information and device information have a relationship of many (zero or more) to many (zero or more). This indicates that the number of the devices 30 assignable with a license of each application included in one package can be zero and one or more, including a case when the license is not assigned to the device 30, and the number of the licenses assigned to the device 30 can be zero and one or more, including a case when the license is not assigned to the device 30. In FIG. 5, the license information is indicated by "0 . . . m" and the device information is indicated by "0 . . . m."

As described above, the package information and the service information have the relationship of one to one, and the service information and the license information have the relationship of one to many. This means that when a tenant purchases one package, a license that allows the tenant to use all of applications included in the one package can be assigned to the tenant. That is, in this description, it is assumed that the license is set for each package unit. Therefore, in this description, the license required for using the application included in the package may be simply referred to as a "package license."

Further, it is assumed that the number of devices 30 that can be assigned with one license is set for each package in advance.

Further, the package information, the application information, the application setting information, and the service information can be prepared, for example, by creating and releasing a package (and application), and then the package information, the application information, the application setting information, and the service information are respectively stored in the package information storage unit 120, the application information storage unit 130, the application setting information storage unit 140, and the service information storage unit 150. Further, for example, when a new device 30 is to be disposed in the system environment E, the device information of the new device 30 is created by the terminal apparatus 20, and then stored in the device information storage unit 170. Further, the license information can be prepared for example, by an administrator of the system environment E when purchasing the package, and then the license information is stored in the license information storage unit 160.

Hereinafter, a description is given of the package information stored in the package information storage unit 120 with reference to FIG. 6. FIG. 6 illustrates an example of the package information.

As illustrated in FIG. 6, the package information stored in the package information storage unit 120 includes data items, such as "package ID, package name, package description, service ID, and application ID list."

The "package ID" is identification information identifying the package information. The "package name" is a name of package.

In an example case of FIG. 6, the package information having the package ID of "P001" sets "storage A package" as the "package name." This indicates that the package indicated by the package information corresponds to a package including, for example, an application that cooperates with "storage A" used as the external storage service.

Similarly, the package information having the package ID of "P002" sets "storage B package" as the "package name." This indicates that the package indicated by the package information is a package including, for example, an application that cooperates with "storage B" used as an external storage service.

The "package description" is a description of package, such as a description what application is included in the package.

The "service ID" is identification information identifying service information (e.g., service ID) associated with the package information.

The "application ID list" is a list of identification information (e.g., application ID) identifying application information indicating each application included in the package.

In an example case of FIG. 6, the package information having the "package ID" of "P001" sets "APP001" and "APP002" in the "application ID list." This indicates that the package indicated by the package information having the "package ID" of "P001" includes one application identified by the application ID of "APP 001" and another application identified by the application ID of "APP 002."

Further, the package information is not limited to the above described data items, but can include various data items, such as "release date" indicating a date when a package was released (a date on which the sale was started), "update date" indicating a date when a package was updated, and the like.

Hereinafter, a description is given of the application information stored in the application information storage unit 130 with reference to FIG. 7. FIG. 7 illustrates an example of the application information.

As illustrated in FIG. 7, the application information stored in the application information storage unit 130 includes data items, such as "application ID, application name, application description, creation date, and developer information."

The "application ID" is identification information identifying application information indicating each application. The "application name" is a name of application.

In an example case of FIG. 7, the application information having the application ID of "APP001" sets "Scan to Email" as "application name." This indicates that the application indicated by the application information is an application for transmitting image data, for example, generated by performing a scanning operation at the device 30, to a designated mail address.

Similarly, the application information having the application ID of "APP002" sets "Scan to Me" as "application name." This indicates that the application indicated by the application information is an application for transmitting image data, for example, generated by performing a scanning operation at the device 30, to a local mail address set for the device 30 used as a local device.

Similarly, the application information having the application ID of "APP003" sets "Scan to Storage A" as "application name." This indicates that the application indicated by the application information is an application for storing (uploading) image data, for example, generated by performing a scanning operation at the device 30, into "storage A" used as an external storage service.

The "application description" is a description of application (e.g., description of what application is set). The "creation date" is a date when the application was created. The "developer information" is information of one or more developers who has developed the application (e.g., developer name, development department, contact address).

Further, the application information is not limited to the above described data items, but can include various data items, such as "release date" indicating a date when a package was released, "update date" indicating a date when a package was updated, and the like.

Hereinafter, a description is given of the application setting information stored in the application setting information storage unit 140 with reference to FIG. 8. FIG. 8 illustrates an example of the application setting information.

As illustrated in FIG. 8, the application setting information stored in the application setting information storage unit 140 includes data items, such as "application setting ID, application ID, and default setting."

The "application setting ID" is identification information identifying the application setting information. The "application ID" is an application ID identifying the application information associated with the application setting information. The "default setting" is default settings when the application is used.

In an example case of FIG. 8, the application setting information having the application setting ID of "SET001" sets "resolution=300 dpi (dot per inch)" as "default setting." This indicates that "resolution=300 dpi" is applied as the default setting when the application identified by the application ID of "APP001" is used.

Further, the application setting information is not limited to the above described data items, but can include various data items, such as "creation date" indicating a date when the application setting information was created.

Hereinafter, a description is given of the service information stored in the service information storage unit 150 with reference to FIG. 9. FIG. 9 illustrates an example of the service information.

As illustrated in FIG. 9, the service information stored in the service information storage unit 150 includes data items, such as "service ID, service name, service description, and service type."

The "service ID" is identification information identifying the service information. The "service name" is a name of service.

In an example case of FIG. 9, the service information having the service ID of "S11111" sets "storage A associated service" as the "service name." This indicates that the service associated with the storage A is introduced or installed by the package indicated by the package information associated with the service information having the service ID of "S11111."

Similarly, the service information having the service ID of "S22222" sets "storage B associated service" as the "service name." This indicates that the service associated with the storage B is introduced or installed by the package indicated by the package information associated with the service information having the service ID of "S22222."

The "service description" is a description of service (e.g., description of what service is set). The "service type" is a type of service. The service type is, for example, "cloud service" indicating that the service is provided as the cloud service. In addition to "cloud service," the service type can set, for example, "web service" indicating that the service is provided by a web application.

Further, the service information is not limited to the above described data items, but can include various data items, such as "price" corresponding to a price of the package indicated by the package information associated with the service information.

Hereinafter, a description is given of the license information stored in the license information storage unit 160 with reference to FIG. 10. FIG. 10 illustrates an example of the license information.

As illustrated in FIG. 10, the license information stored in the license information storage unit 160 includes data items, such as "license ID, license name, tenant ID, use start date, scheduled termination date, termination date, status, number of allowable devices, in-use device ID, and service ID."

The "license ID" is identification information identifying the license information. The "license name" is a name of license. For example, if a package has a package name of "storage A package," the license name of the package becomes "storage A package license."

The "tenant ID" is identification information identifying a tenant that is assigned with the license by purchasing the package.

The "use start date" is a date when the license has become valid (e.g., date when the package was purchased, date when the license was validated). The "scheduled termination date" is a scheduled termination date of the license. The "termination date" is a date when the license was actually terminated. If the license has not yet been terminated, for example, a blank can be set in the "termination date" as illustrated in FIG. 10.

The "status" is a status of license. The "status" sets, for example, "in use" indicating that a license is valid and "terminated" indicating that a license is invalid due to expiration of the license period. Further, if the license becomes invalid before the scheduled termination date of the license, for example, by cancelling a license contract, the "status" can be set with "cancelled or revoked."

The "number of allowable devices" is the upper limit number of devices 30 that can use the application included in the purchased package. Further, if the data item "status" has a value indicating that the application cannot be used such as "terminated" and "cancelled," the "number of allowable devices" is set with, for example, hyphen (-).

The "in-use device ID" is a list of device ID of the device 30 (i.e., one or more devices 30 assigned with the license) that uses the application included in the purchased package. The device ID is identification information identifying the device 30. The device ID is, for example, a manufacturing number and/or serial number uniquely set for each one of the devices 30. Further, if the "status" has a value indicating that the application cannot be used such as "terminated" and "cancelled," the "in-use device ID" is set with, for example, hyphen (-).

The "service ID" is a service ID identifying the service information associated with the license information. In this example case, the license information having the license ID of "L12346" and the license information having the license ID of "L12347" are set with the same service ID of "S22222." This indicates that after the license indicated by the license information having the license ID of "L12346" was terminated, the same license is updated and assigned for the license information having the license ID of "L12347." As above described, when the license of the package indicated by the package information corresponding to one service information is terminated and then the license of the same package is updated, the data item of "service ID" of the license information indicating the license is set with the same service ID.

Further, the license information is not limited to the above described data items, but can include, for example, "purchase date" indicating a date when the package was purchased, "purchaser information" indicating information of the purchaser of the package, and the like.

Hereinafter, a description is given of the device information stored in the device information storage unit 170 with reference to FIG. 11. FIG. 11 illustrates an example of the device information.

As illustrated in FIG. 11, the device information stored in the device information storage unit 170 includes data items, such as "device ID, device description, tenant ID, and registration date."

The "device ID" is identification information identifying the device 30. The "device description" is a description of the device 30. (e.g., which type of model is installed on which floor of which building). The "tenant ID" is identification information identifying a tenant who owns and/or uses the device 30. The "registration date" is a date when the device information was stored in the device information storage unit 170.

Further, the device information is not limited to the above described data items, but can include data item, such as "device name" indicating a name of the device 30.

Processing:

Hereinafter, a description is given of details of processing in the cloud system 1 according to the embodiment.

Figure 12B:
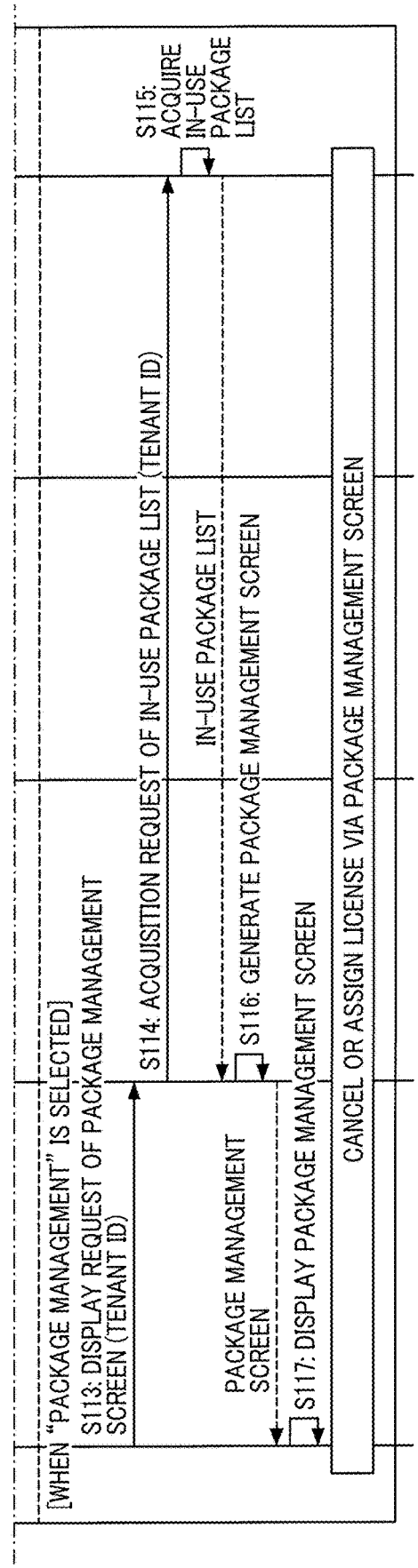

Processing of License Management:

Hereinafter, a description is given of processing of license management performed by a user of the terminal apparatus 20 using the browser 210 with reference to FIG. 12, in which the user may be an administrator of the system environment E. FIG. 12 (12A and 12B) illustrates an example of a sequence diagram of the license management processing. In the following description, the user uses, for example, the browser 210 of the terminal apparatus 20, but the user can use the browser 310 of the device 30.

For example, when a login screen used for logging in the cloud server 10 is displayed on the terminal apparatus 20, the browser 210 receives an input operation of login information from the user via the login screen (step S101). The login information is information input by the user on the login screen. The login information includes, for example, a set of a user identification (ID) and a password input by the user, and a tenant identification (ID) input by the user.

When the browser 210 receives the input operation of the login information, the browser 210 transmits a login request to the cloud server 10 (step S102). The login request includes the login information.

In response to receiving the login request, the web service unit 101 transmits the login request to the authentication unit 102 (step S103).

In response to receiving the login request, the authentication unit 102 refers to the authentication information stored in the authentication information storage unit 110 to perform a login authentication (step S104). That is, the authentication unit 102 performs the login authentication by determining whether the authentication information, which matches the set of the user ID and the password included in the login information, is stored in the authentication information storage unit 110.

Then, the authentication unit 102 returns an authentication result of the login authentication to the web service unit 101. In the following description, it is assumed that the authentication unit 102 returns the authentication result indicating that the login authentication is successful to the web service unit 101.

When the authentication result indicating that the login authentication is successful is returned from the authentication unit 102, the web service unit 101 generates a menu screen, which is the first screen to be displayed after the user logs in to the cloud server 10 (step S105). The menu screen is a screen defined by, for example, hypertext markup language (HTML) and cascading style sheets (CSS) and displayed using the browser 210.

Then, the web service unit 101 returns the generated menu screen to the browser 210.

Figure 13:
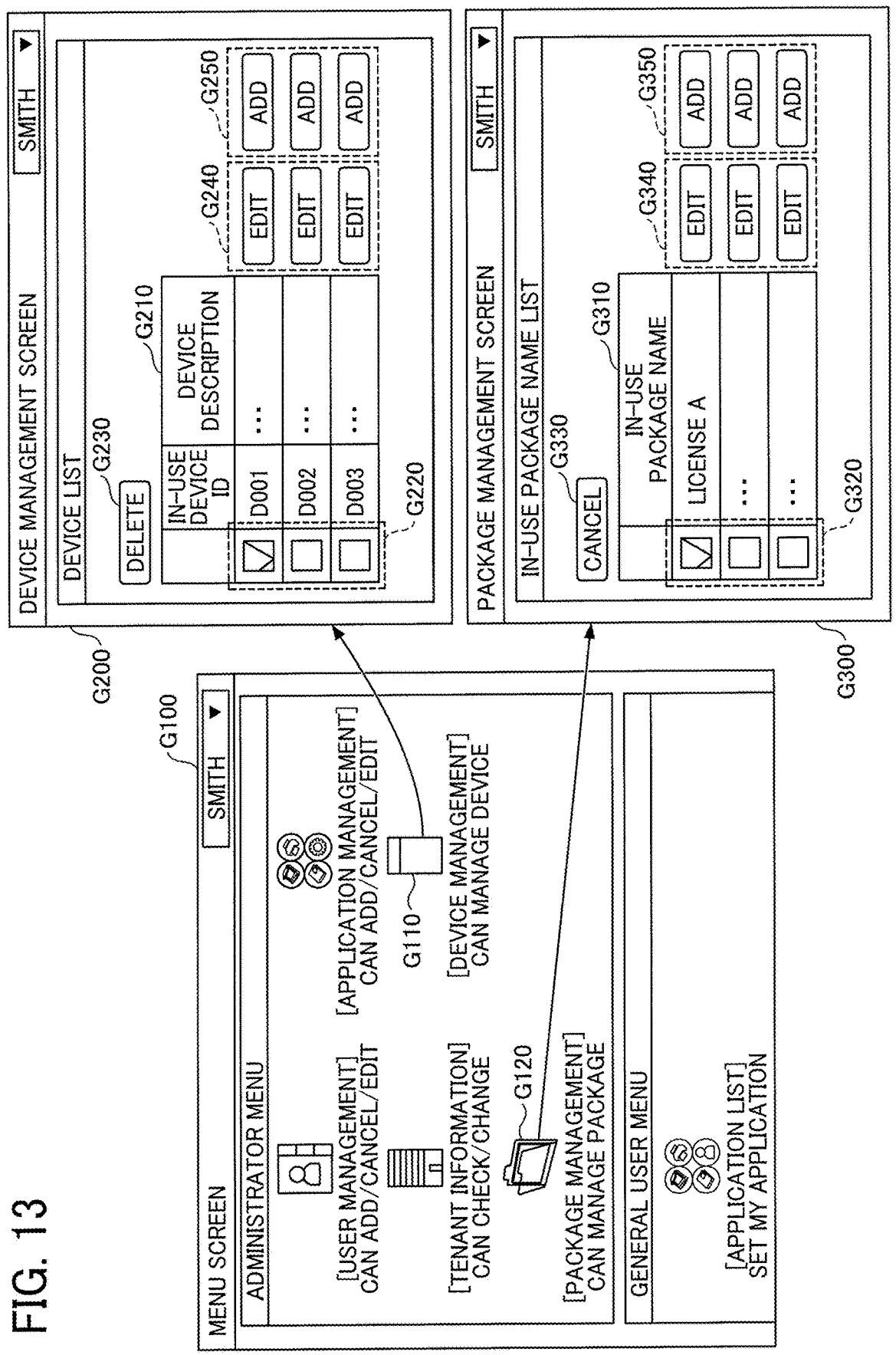
FIG. 13 illustrates an example of a menu screen, a device management screen, and a package management screen.

When the generated menu screen is returned from the web service unit 101, the browser 210 displays, for example, a menu screen G100 illustrated in FIG. 13 (step S106). As illustrated in FIG. 13, the menu screen G100 includes, for example, a device management icon G110 and a package management icon G120. By performing a selection operation of the device management icon G110, the user can shift the menu screen G100 to a device management screen G200 illustrated in FIG. 13. Further, by performing a selection operation of the package management icon G120, the user can shift the menu screen G100 to a package management screen G300 illustrated in FIG. 13.

The device management screen G200 (first screen) is a screen used for assigning a license to the device 30 identified by the device ID and for cancelling a license assigned to the device 30 identified by the device ID, starting from the device ID. Further, the package management screen G300 (fourth screen) is a screen used for cancelling the license from the device 30 being assigned with the license ID and for assigning the license corresponding to the license ID to the device 30, starting from the license ID associated with the package.

In the following description, it is assumed that either the selection operation of the device management icon G110 or the selection operation of the package management icon G120 is performed by the user.

Further, as illustrated in FIG. 13, the menu screen G100 includes, for example, an administrator menu and a general user menu. For example, if a user right is an administrator right, both the administrator menu and the general user menu are displayed while if a user right is a general user right, the general user menu alone is displayed. Therefore, to perform the selection operation of the device management icon G110 or the selection operation of the package management icon G120, the user to log in the cloud server 10 is required to use a user ID having at least the administrator right.

Then, the browser 210 receives the selection operation of the device management icon G110 or the selection operation of the package management icon G120 (step S107).

If the browser 210 receives the selection operation of the device management icon G110, the sequence of steps S108 to S112, to be described later, is executed. On the other hand, if the browser 210 receives the selection operation of the package management icon G120, the sequence of steps S113 to S117, to be described later, is executed.

If the browser 210 receives the selection operation of the device management icon G110 in step S107, the browser 210 transmits a display request of the device management screen to the cloud server 10 (step S108) as a first request. The display request of the device management screen includes the tenant ID input by the user. Further, for example, if the tenant ID included in the login information transmitted in step S102 is already retained or stored in the cloud server 10, it is not required to include the tenant ID in the display request.

When the web service unit 101 receives the display request of the device management screen, the web service unit 101 transmits a request for acquiring a device list to the device management unit 105 (step S109). The request for acquiring the device list (the acquisition request of the device list) includes the tenant ID.

In response to receiving the acquisition request of the device list, the device management unit 105 acquires a list of device information being set with the tenant ID included in the acquisition request of the device list (step S110). Hereinafter, the list of device information is referred to as "device list." That is, the device management unit 105 acquires the device information being set with the tenant ID from the device information stored in the device information storage unit 170 as the device list.

Then, the device management unit 105 transmits the acquired device list to the web service unit 101.

When the device list is returned from the device management unit 105, the web service unit 101 generates the device management screen based on the device list (step S111). The device management screen is a screen defined by, for example, HTML and CSS and displayed using the browser 210.

Then, the web service unit 101 returns the generated device management screen to the browser 210.

When the device management screen is returned from the web service unit 101, the browser 210 displays, for example, the device management screen G200 illustrated in FIG. 13 (step S112). The user can cancel and assign the license on the device management screen G200 illustrated in FIG. 13, starting from the device ID.

The device management screen G200 (FIG. 13) includes, for example, a device list display field G210, in which the device ID of the device 30 owned and/or used by the tenant identified by the tenant ID is displayed as "in-use device ID." Further, the device list display field G210 displays, for example, "device description" indicating information of the device 30, such as the device 30 is located on which floor of which building. The list of "in-use device ID" displayed in the device list display field G210 is generated based on the device list acquired in step S110.

Further, the device management screen G200 (FIG. 13) includes, for example, a check box G220 for selecting the in-use device ID from the device list display field G210.

After the user selects the desired in-use device ID by selecting the check box G220 and selects a delete button G230, the user can cancel the license assigned to the device 30 identified by the selected device ID, and then delete the device information of the device 30 identified by the selected device ID. With this configuration, for example, when the device 30 is to be replaced with another or a new device, the user can easily cancel the license assigned to the device 30 that is to be replaced with another or the new device, in which the device 30 is a target device to be replaced.

Further, by selecting an edit button G240, the user can cancel a part of the licenses assigned to the device 30 identified by the in-use device ID corresponding to the edit button G240. With this configuration, the user can easily cancel a part of the licenses alone assigned to the selected device 30.

Further, by selecting an add button G250, the user can assign a license to the device 30 identified by the in-use device ID corresponding to the add button G250. With this configuration, when the device 30 is to be replaced with another or new device, the user can easily assign the license to another or new device, in which the license assigned to the device 30 is cancelled, and then the same license is assigned to another or new device that is a replacement destination of the license.

The process of assigning the license from the device management screen G200 illustrated in FIG. 13 and the process of cancelling the license from the device management screen G200 illustrated in FIG. 13 will be described in detail later.

The description is returned to FIG. 12. When the browser 210 receives the selection operation of the package management icon G120 in step S107, the browser 210 transmits a display request of the package management screen to the cloud server 10 (step S113) as a second request. The display request of the package management screen includes the tenant ID input by the user. Further, for example, if the tenant ID included in the login information transmitted in step S102 is already retained or stored in the cloud server 10, it is not required to include the tenant ID in the display request.

When the web service unit 101 receives the display request of the package management screen, the web service unit 101 transmits a request for acquiring an in-use package list to the license management unit 104 (step S114). The request for acquiring the in-use package list (the acquisition request of the in-use package list) includes the tenant ID.

When the license management unit 104 receives the acquisition request of the in-use package list, the license management unit 104 acquires a list of license information being set for the tenant ID included in the acquisition request of the in-use package list (step S115). Hereinafter, the list of license information may be also referred to as "in-use package list." That is, the license management unit 104 acquires the license information including the tenant ID from the license information stored in the license information storage unit 160 as the in-use package list. At this timing, the license management unit 104 can acquire the license information including the tenant ID and at least one device ID as the in-use package list.

Further, since the license information including the tenant ID is information indicating the license of the package that becomes valid for use due to the purchasing by the tenant identified by the tenant ID, the list of license information is described as "in-use package list" in the embodiment. However, this is just a convenience of notation, and the list of license information can be also referred to as "in-use license list."

Then, the license management unit 104 transmits the acquired in-use package list to the web service unit 101.

When the in-use package list is returned from the license management unit 104, the web service unit 101 generates a package management screen based on the in-use package list (step S116). The package management screen is a screen defined by, for example, HTML and CSS and displayed using the browser 210.

Then, the web service unit 101 returns the generated package management screen to the browser 210.

When the package management screen is returned from the web service unit 101, the browser 210 displays, for example, the package management screen G300 illustrated in FIG. 13 (step S117). On the package management screen G300 (FIG. 13), the user can cancel and assign the license starting from the package name (i.e., license name).

As illustrated in FIG. 13, the package management screen G300 includes, for example, an in-use package list display field G310, in which a license name of each package purchased by the tenant identified by the tenant ID is displayed as "in-use package name," which is the in-use package list. Further, as illustrated in FIG. 13, the package management screen G300 includes, for example, a check box G320 for selecting an in-use package name from the in-use package list display field G310. Further, the list of the in-use package name (i.e., license name) displayed in the in-use package list display field G310 is generated based on the in-use package list acquired in step S115.

The license name is displayed as the "in-use package name" in the in-use package list display field G310 because the user purchases the application based on each package unit, and thereby when the license name is displayed as "in-use package name," the user's convenience becomes higher. Further, for example, if the package name of the package purchased by the user is "storage A package," the license name of this package becomes "storage A package license."

However, it is not limited to a case where the license name included in the license information is displayed in the in-use package list display field G310 as the in-use package name. For example, if the package information associated with the acquired license information is also acquired in step S115, the package name included in the acquired package information can be displayed in the in-use package list display field G310 as the in-use package name. Further, for example, if the service information associated with the acquired license information is also acquired in step S115, the service name included in the acquired service information can be displayed in the in-use package list display field G310 as the in-use package name.

If the user selects the desired in-use package name by selecting the check box G320 and then selects a cancel button G330, the user can cancel the license from the device 30 being assigned with the license indicated by the selected in-use package name. With this configuration, for example, if the user is to stop a use of a particular package, the user can easily and collectively cancel the license assigned to each one of the devices 30 that uses the particular package.

Further, by selecting an edit button G340, the user can cancel the license assigned to one or more devices 30, which is a part of the devices 30 assigned with the license indicated by the in-use package name corresponding to the edit button G340. With this configuration, for example, if the user wants to stop a use of a particular package at the one or more devices 30 alone, which is a part of the devices 30, the user can easily cancel the license assigned to the one or more devices 30 that use the particular package Further, by selecting an add button G350, the user can assign the license indicated by the in-use package name corresponding to the add button G350 to the device 30. With this configuration, for example, if the user wants to assign a license of a particular package to a specific device 30, the user can easily assign the license of the particular package to the specific device 30.

Figure 14B:
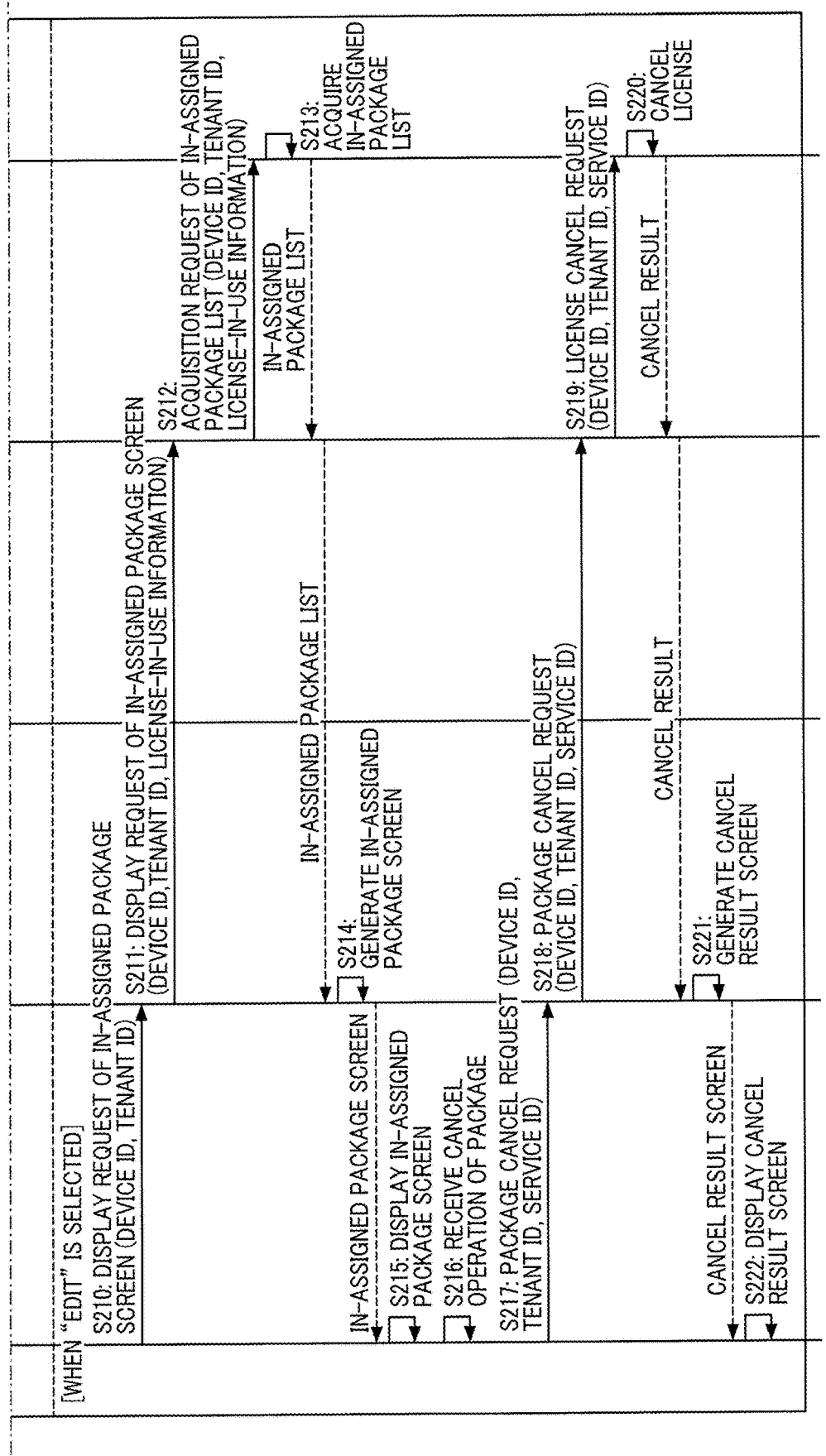

The process of assigning the license from the package management screen G300 illustrated in FIG. 13 and the process of cancelling the license from the package management screen G300 illustrated in FIG. 13 will be described in detail later. Process of Cancelling License from Device Management Screen:

Hereinafter, a description is given of a process of cancelling a license from the device management screen G200 (FIG. 13) with reference to FIG. 14. FIG. 14 (14A and 14B) illustrates an example of a sequence diagram of a process of cancelling a license from the device management screen G200.

At first, the browser 210 receives the selection operation of the delete button G230 or the selection operation of the edit button G240 (step S201). Further, the user selects the desired in-use device ID by selecting the check box G220 before performing the selection operation of the delete button G230.

If the browser 210 receives the selection operation of the delete button G230, the sequence of steps S202 to S209, to be described later, is executed. At this timing, the user can also select a plurality of in-use device IDs by selecting the check box G220. In this case, after the sequence of steps S202 to S206 is executed for each one of the selected in-use device IDs, the sequence of steps S207 to S209 is executed.

On the other hand, if the browser 210 receives the selection operation of the edit button G240, the sequence of steps S210 to S221, to be described later, is executed.

If the browser 210 receives the selection operation of the delete button G230 in step S201, the browser 210 transmits a request for deleting the device information to the cloud server 10 (step S202). The request for deleting the device information (the deletion request of device information) includes the device ID (in-use device ID) selected by selecting the check box G220 and the tenant ID.

When the web service unit 101 receives the deletion request of device information, the web service unit 101 transmits the deletion request of device information to the device management unit 105 (step S203).

In response to receiving the deletion request of device information, the device management unit 105 transmits a request for cancelling the license to the license management unit 104 (step S204). The request for cancelling the license (license cancel request) includes the device ID and the tenant ID.

In response to receiving the license cancel request, the license management unit 104 cancels all of the licenses assigned to the device 30 identified by the device ID included in the license cancel request (step S205). That is, the license management unit 104 identifies the license information including the device ID and the tenant ID from the license information stored in the license information storage unit 160, and then deletes the device ID from the "in-use device ID" of the identified license information. Then, the license management unit 104 returns a cancel result to the device management unit 105.

With this configuration, all of the licenses assigned to the device 30 identified by the device ID are cancelled.

Further, for example, if the same device ID is not used among different tenants (specifically, when a serial number is used as the device ID), the above described request for cancelling the license may not include the tenant ID. In this case, in step S205, the license information including the device ID is identified from the license information stored in the license information storage unit 160, and then the device ID is deleted from the "in-use device ID" of the identified license information.

When the cancel result is returned from the license management unit 104, the device management unit 105 deletes the device information identified by the device ID from the device information storage unit 170 (step S206).

Then, the device management unit 105 acquires a device list set with the tenant ID included in the deletion request of device information (step S207). With this configuration, the device list, removing the device information deleted in step S206, is acquired.

Then, the device management unit 105 transmits the acquired device list to the web service unit 101.

When the device list is returned from the device management unit 105, the web service unit 101 generates the device management screen based on the device list (step S208).

Then, the web service unit 101 returns the generated device management screen to the browser 210.

When the generated device management screen is returned from the web service unit 101, the browser 210 displays, for example, the device management screen G200 illustrated in FIG. 13 (step S209). However, in this case, the device list display field G210 on the device management screen G200 displays the device IDs, removing the concerned device ID included in the device information deleted in step S206, as the list of the device ID.

With this configuration, the user can cancel all of the licenses assigned to the device 30 identified by the device ID selected in the device management screen G200 illustrated in FIG. 13. Further, the user can easily cancel the license by selecting the desired device ID from the device list display field G210 while referring to "device description" and pressing the delete button G230. Therefore, for example, when the device 30 is to be replaced with another or new device, a workload of identifying the device ID of the device 30 to be replaced can be reduced, and an erroneous input caused by a manual inputting operation of the device ID can be prevented.

The description is returned to FIG. 14. If the browser 210 receives the selection operation of the edit button G240 in step S201, the browser 210 transmits a display request of an in-assigned package screen to the cloud server 10 (step S210). The display request of the in-assigned package screen includes the device ID (in-use device ID) corresponding to the selected edit button G240 and the tenant ID.

When the web service unit 101 receives the display request of the in-assigned package screen, the web service unit 101 transmits a request for acquiring an in-assigned package list to the device management unit 105 (step S211). The request for acquiring the in-assigned package list (the acquisition request of the in-assigned package list) includes the device ID, the tenant ID, and license-in-use information indicating a status of the license use is valid.

When the device management unit 105 receives the acquisition request of the in-assigned package list, the device management unit 105 transmits the acquisition request of the in-assigned package list to the license management unit 104 (step S212).

When the license management unit 104 receives the acquisition request of the in-assigned package list, the license management unit 104 acquires a list of license information being set with the tenant ID, the device ID, and the license-in-use information included in the acquisition request (step S213). Hereinafter, the list of license information is also referred to as "in-assigned package list." That is, the license management unit 104 acquires the license information including the tenant ID, the device ID, and the license-in-use information from the license information stored in the license information storage unit 160 as the in-assigned package list.

Then, the license management unit 104 returns the acquired in-assigned package list to the device management unit 105. Then, the device management unit 105 returns the in-assigned package list, returned from the license management unit 104, to the web service unit 101.

When the in-assigned package list is returned from the device management unit 105, the web service unit 101 generates the in-assigned package screen based on the in-assigned package list (step S214). Then, the web service unit 101 returns the generated in-assigned package screen to the browser 210.

Figure 15:
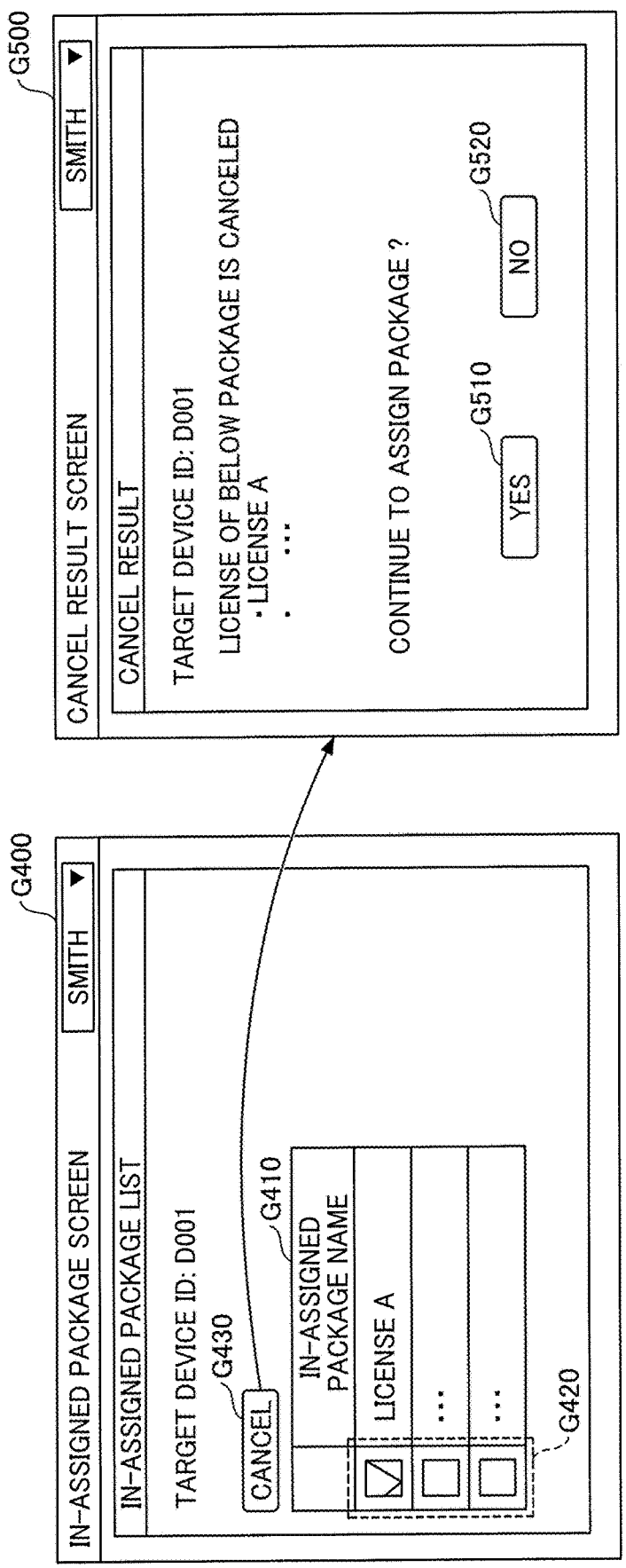
FIG. 15 illustrates an example of an in-assigned package screen and a cancel result screen.

When the in-assigned package screen is returned from the web service unit 101, the browser 210 displays, for example, an in-assigned package screen G400 illustrated in FIG. 15 (step S215).

As illustrated in FIG. 15, the in-assigned package screen G400 (second screen) includes, for example, an in-assigned package name list display field G410 displaying a list of the license name of the license assigned to the device 30 identified by the device ID as "in-assigned package name." Further, the list of in-assigned package name displayed in the in-assigned package name list display field G410 is generated based on the in-assigned package list acquired in step S213.

When the user selects the desired in-assigned package name from a check box G420 and selects a cancel button G430, the user can cancel the license indicated by the selected in-assigned package name from the device 30. With this configuration, for example, if the user is to cancel a use of a particular package assigned to a specific device 30, the user can cancel the license of the particular package assigned to the specific device 30. In the following description, it is assumed that the user selects the desired in-assigned package name by selecting the check box G420 and selects the cancel button G430 (i.e., package cancel operation). At this timing, the user can also select a plurality of in-assigned package names by selecting the check box G420. In this case, after the sequence of steps S216 to S220 is executed for each of the selected in-assigned package names, the sequence of steps S221 to S222 is executed.

Then, the browser 210 receives the cancel operation of the package (step S216). When the browser 210 receives the package cancel operation, the browser 210 transmits a request for cancelling the package to the web service unit 101 (step S217). The request for cancelling the package (the package cancel request) includes the device ID of the device 30, the tenant ID, and the service ID associated with the in-assigned package name selected by selecting the check box G420. The service ID associated with the in-assigned package name is a service ID included in the license information that is associated with the license name being displayed as the in-assigned package name.

In response to receiving the package cancel request, the web service unit 101 transmits the package cancel request to the device management unit 105 (step S218).

In response to receiving the package cancel request, the device management unit 105 transmits a license cancel request to the license management unit 104 (step S219). The license cancel request includes the device ID, the tenant ID, and the service ID.

In response to receiving the license cancel request, the license management unit 104 cancels the license identified by the tenant ID and the service ID among the licenses assigned to the device 30 identified by the device ID included in the cancel request (step S220). That is, the license management unit 104 identifies the license information including the device ID, the tenant ID, and the service ID from the license information stored in the license information storage unit 160, and then deletes the device ID from the "in-use device ID" of the identified license information. With this configuration, among the licenses assigned to the device 30 identified by the device ID, the license selected by the user (the license associated with the in-assigned package name) is cancelled from the device 30 identified by the device ID.

Then, the license management unit 104 returns a cancel result to the device management unit 105. Then, the device management unit 105 returns the cancel result, returned from the license management unit 104, to the web service unit 101.

When the cancel result is returned from the device management unit 105, the web service unit 101 generates a cancel result screen (step S221). Then, the web service unit 101 returns the generated cancel result screen to the browser 210.

When the cancel result screen is returned from the web service unit 101, the browser 210 displays, for example, a cancel result screen G500 illustrated in FIG. 15 (step S222).

As illustrated in FIG. 15, the cancel result screen G500 displays information indicating that the license associated with the in-assigned package name selected in the in-assigned package screen G400 (FIG. 15) is cancelled from the device 30 identified by the device ID selected in the device management screen G200 (FIG. 13). Further, the cancel result screen G500 (FIG. 15) includes, for example, "YES" button G510 and "NO" button G520 for selecting whether to continue the assignment of package.

If the "YES" button G510 is selected by the user, the browser 210 displays a screen (i.e., assignable package screen G600 to be described later) to assign a license to the device 30 identified by the device ID. On the other hand, if the "NO" button G520 is selected by the user, the browser 210 displays the device management screen G200 (FIG. 13).

With this configuration, the user can cancel the license of the in-assigned package name (license name) selected in the in-assigned package screen G400 (FIG. 15) from the device 30 identified by the device ID selected in the device management screen G200 (FIG. 13). Therefore, for example, if the user wants to cancel only a particular license assigned to a specific device 30, the user can easily cancel the particular license without a manual inputting operation of the license ID, the device ID, or the like.

Figure 16B:
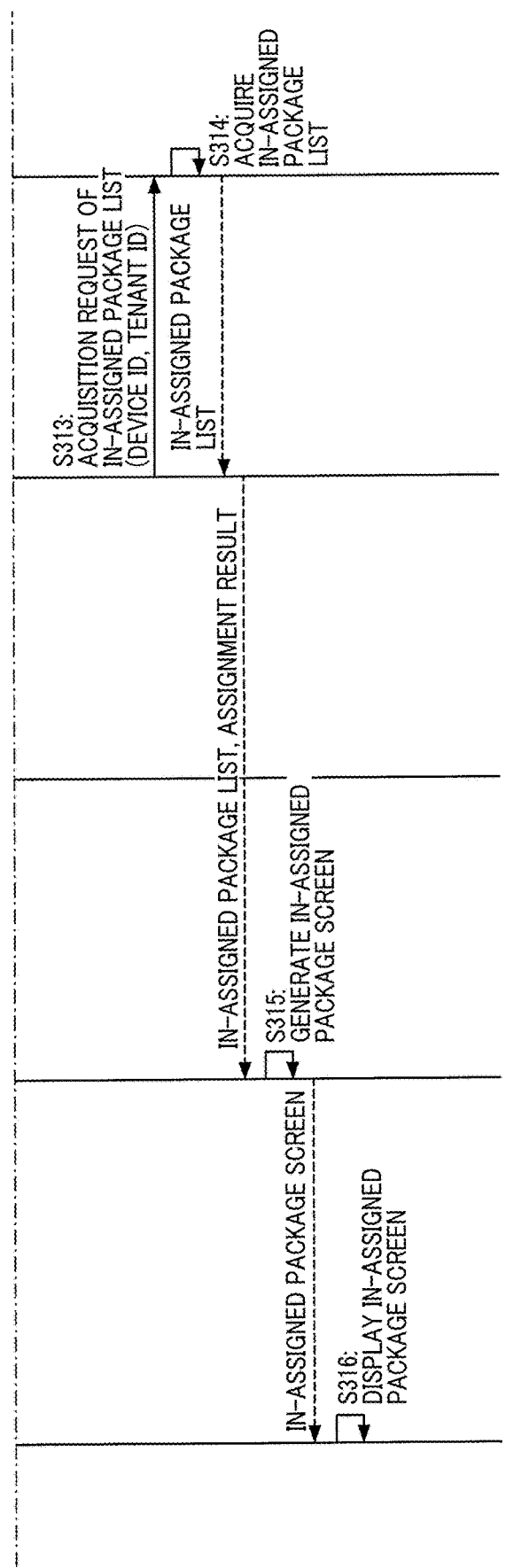

Process of Assigning License from Device Management Screen:

Hereinafter, a description is given of a process of assigning a license from the device management screen G200 (FIG. 13) with reference to FIG. 16. FIG. 16 (16A and 16B) illustrates an example of a sequence diagram of a process of assigning the license from the device management screen G200.

At first, the browser 210 receives the selection operation of the add button G250 (step S301).

When the browser 210 receives the selection operation of the add button G250, the browser 210 transmits a display request of an assignable package screen to the cloud server 10 (step S302). The display request of the assignable package screen includes the device ID (in-use device ID) corresponding to the selected add button G250 and the tenant ID.

When the web service unit 101 receives the display request of the assignable package screen, the web service unit 101 transmits a request for acquiring an assignable package list to the device management unit 105 (step S303). The request for acquiring the assignable package list (the acquisition request of the assignable package list) includes the device ID and the tenant ID.

In response to receiving the acquisition request of the assignable package list, the device management unit 105 transmits the acquisition request of the assignable package list to the license management unit 104 (step S304).

In response to receiving the acquisition request of the assignable package list, the license management unit 104 acquires a list of license information being set with the tenant ID included in the acquisition request and not being set with the device ID included in the acquisition request (step S305). Hereinafter, the list of license information may be also referred to as "assignable package list." That is, the license management unit 104 acquires the license information including the tenant ID but not including the device ID from the license information stored in the license information storage unit 160 as the assignable package list.

Then, the license management unit 104 returns the acquired assignable package list to the device management unit 105. Then, the device management unit 105 returns the assignable package list, returned from the license management unit 104, to the web service unit 101.

When the assignable package list is returned from the device management unit 105, the web service unit 101 generates an assignable package screen based on the assignable package list (step S306). Then, the web service unit 101 returns the generated assignable package screen to the browser 210.

Figure 17:
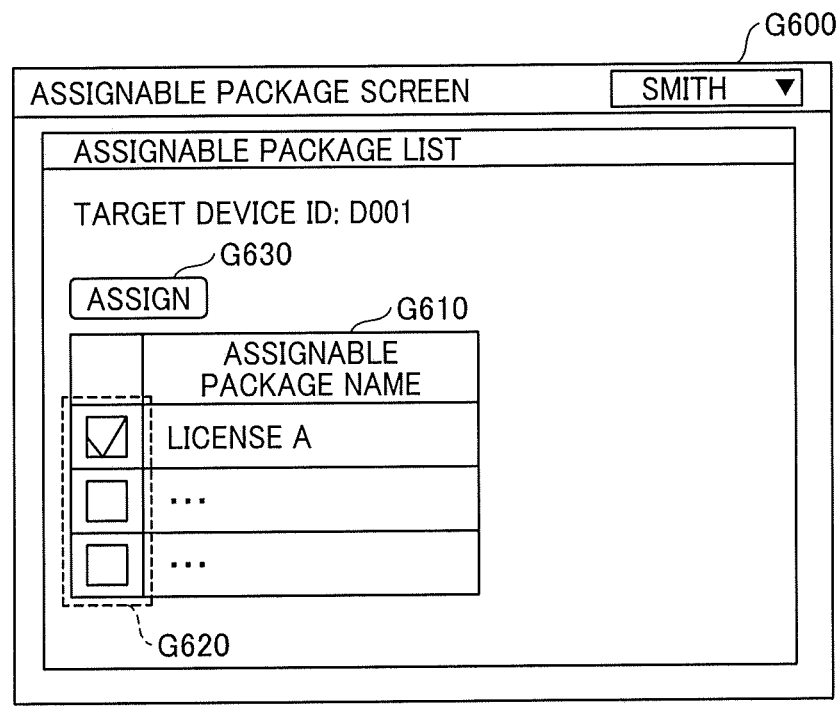
FIG. 17 illustrates an example of an assignable package screen.

When the generated assignable package screen is returned from the web service unit 101, the browser 210 displays, for example, an assignable package screen G600 illustrated in FIG. 17 (step S307).

As illustrated in FIG. 17, the assignable package screen G600 (third screen) includes, for example, an assignable package list display field G610 displaying the license name of the license that can be assigned to the device 30 identified by the device ID as "assignable package name." The list of assignable package name displayed in the assignable package list display field G610 is generated based on the assignable package list acquired in step S305.

When the user selects the desired assignable package name from a check box G620 and then selects an assignment button G630, the user can assign the license indicated by the selected assignable package name to the device 30. With this configuration, for example, if the user wants to use a particular package at a specific device 30, the user can assign the license of the particular package to the specific device 30. In the following description, it is assumed that the user selects the desired assignable package name by selecting the check box G620 and then selects the assignment button G630 (i.e., package assignment operation). At this timing, the user can also select a plurality of assignable package names by selecting the check box G620. In this case, after the sequence of steps S309 to S312 is executed for each of the selected assignable package names, the sequence of steps S313 to S316 is executed.

The browser 210 receives the assignment operation of the package (step S308). When the browser 210 receives the package assignment operation, the browser 210 transmits an assignment request of the package to the web service unit 101 (step S309). The package assignment request includes the device ID of the device 30, the tenant ID, and the service ID associated with the assignable package name selected by selecting the check box G620. The service ID associated with the assignable package name is a service ID included in license information that is associated with the license name being displayed as the assignable package name.

When the web service unit 101 receives the package assignment request, the web service unit 101 transmits the package assignment request to the device management unit 105 (step S310).

When the device management unit 105 receives the package assignment request, the device management unit 105 transmits a license assignment request to the license management unit 104 (step S311). The license assignment request includes the device ID, the tenant ID, and the service ID.

In response to receiving the license assignment request, the license management unit 104 assigns a license identified by the tenant ID and the service ID included in the license assignment request to the device 30 identified by the device ID included in the license assignment request (step S312). That is, the license management unit 104 identifies the license information including the tenant ID and the service ID from the license information stored in the license information storage unit 160, and then adds the device ID to the "in-use device ID" of the identified license information. With this configuration, a license selected by the user (i.e., license associated with the assignable package name) is assigned to the device 30 identified by the device ID. Then, the license management unit 104 transmits an assignment result to the device management unit 105.

When the assignment result is returned from the license management unit 104, the device management unit 105 transmits a request for acquiring the in-assigned package list to the license management unit 104 (step S313). The acquisition request of the in-assigned package list includes the device ID and the tenant ID.

In response to receiving the acquisition request of the in-assigned package list, the license management unit 104 acquires the in-assigned package list being set with the tenant ID, the device ID, and the license-in-use information included in the acquisition request of the in-assigned package list (step S314). That is, the license management unit 104 acquires the license information including the tenant ID, the device ID, and the license-in-use information indicating the license-use is being valid from the license information stored in the license information storage unit 160 as the in-assigned package list.

Then, the license management unit 104 returns the acquired in-assigned package list to the device management unit 105. Then, the device management unit 105 transmits the in-assigned package list and the assignment result returned from the license management unit 104 to the web service unit 101.

When the in-assigned package list is returned from the device management unit 105, the web service unit 101 generates the in-assigned package screen based on the in-assigned package list (step S315). Then, the web service unit 101 returns the generated in-assigned package screen to the browser 210.

Further, the web service unit 101 can use the assignment result returned from the device management unit 105 to generate a screen (i.e., assignment completion screen) displaying a message that the assignment of license has been completed and can return the assignment completion screen to the browser 210. With this configuration, the assignment completion screen can be displayed by the browser 210.

When the in-assigned package screen is returned from the web service unit 101, the browser 210 displays, for example, the in-assigned package screen G400 illustrated in FIG. 15 (step S316). However, in this case, the in-assigned package name list display field G410 in the in-assigned package screen G400 also displays the added license name indicating the license assigned in step S312 as the in-assigned package name.

With this configuration, the user can assign the license of the assignable package name (license name) selected on the assignable package screen G600 (FIG. 17) to the device 30 selected in the device management screen G200 (FIG. 13). Therefore, for example, if the device 30 is to be replaced with another or new device, a workload of identifying the device ID of the device 30 to be replaced can be reduced, and an erroneous input caused by a manual inputting operation of the device ID and the license ID can be prevented.

Figure 18B:
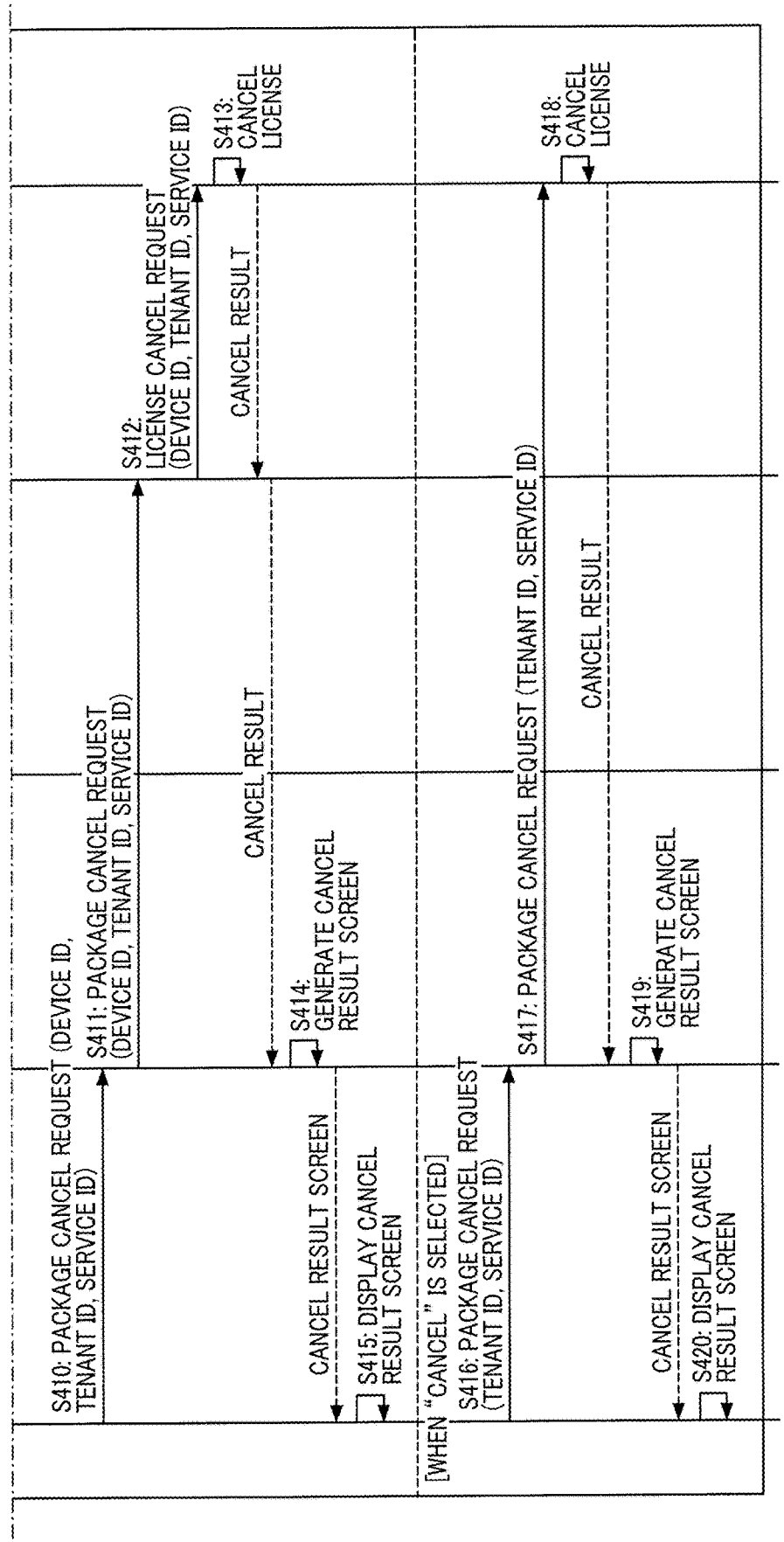

Process of Cancelling License from Package Management Screen:

Hereinafter, a description is given of a process for cancelling a license from the package management screen G300 (FIG. 13) with reference to FIG. 18. FIG. 18 (18A and 18B) illustrates an example of a sequence diagram of a process of cancelling the license from the package management screen G300.

At first, the browser 210 receives the selection operation of the cancel button G330 or the selection operation of the edit button G340 (step S401). Further, the user selects the desired in-use package name by selecting the check box G320 before performing the selection operation of the cancel button G330.

When the browser 210 receives the selection operation of the edit button G340, the sequence of steps S402 to S415, to be described later, is executed.

On the other hand, when the browser 210 receives the selection operation of the cancel button G330, the sequence of steps S416 to S420, to be described later, is executed. At this timing, the user can also select a plurality of in-use package names by selecting the check box G320. In this case, after the sequence of steps S416 to S418 is executed for each of the selected in-use package names, the sequence of steps S419 to S420 is executed.

When the browser 210 receives the selection operation of the edit button G340 in step S401, the browser 210 transmits a request for displaying an in-assigned device screen to the cloud server 10 (step S402). The request for displaying the in-assigned device screen (the display request of the in-assigned device screen) includes the tenant ID and the service ID corresponding to the selected edit button G340. The service ID corresponding to the edit button G340 is a service ID included in the license information that is associated with the license name being displayed as the in-use package name corresponding to the edit button G340.

When the web service unit 101 receives the display request of the in-assigned device screen, the web service unit 101 transmits a request for acquiring the in-assigned device list to the device management unit 105 (step S403). The request for acquiring the in-assigned device list (the acquisition request of the in-assigned device list) includes the tenant ID, the service ID, and the license-in-use information indicating the license-use is being valid.

When the device management unit 105 receives the acquisition request of the in-assigned device list, the device management unit 105 transmits a request for acquiring the license information to the license management unit 104 (step S404).

In response to receiving the request for acquiring license information (acquisition request of the license information), the license management unit 104 acquires the license information being set with the service ID and the tenant ID included in the acquisition request of the license information from the license information storage unit 160 (step S405).

Then, the license management unit 104 transmits the acquired license information to the device management unit 105.

When the license information is returned from the license management unit 104, the device management unit 105 acquires a list of device information including the device ID set in the "in-use device ID" of the license information from the device information storage unit 170 (step S406). Hereinafter, the list of device information may be also referred to as "in-assigned device list." That is, the device management unit 105 acquires the device information including the device ID set in the "in-use device ID" of the license information from the device information stored in the device information storage unit 170 as the in-assigned device list.

Then, the device management unit 105 returns the acquired in-assigned device list to the web service unit 101.

When the in-assigned device list is returned from the device management unit 105, the web service unit 101 generates an in-assigned device screen based on the in-assigned device list (step S407). Then, the web service unit 101 returns the generated in-assigned device screen to the browser 210.

Figure 19:
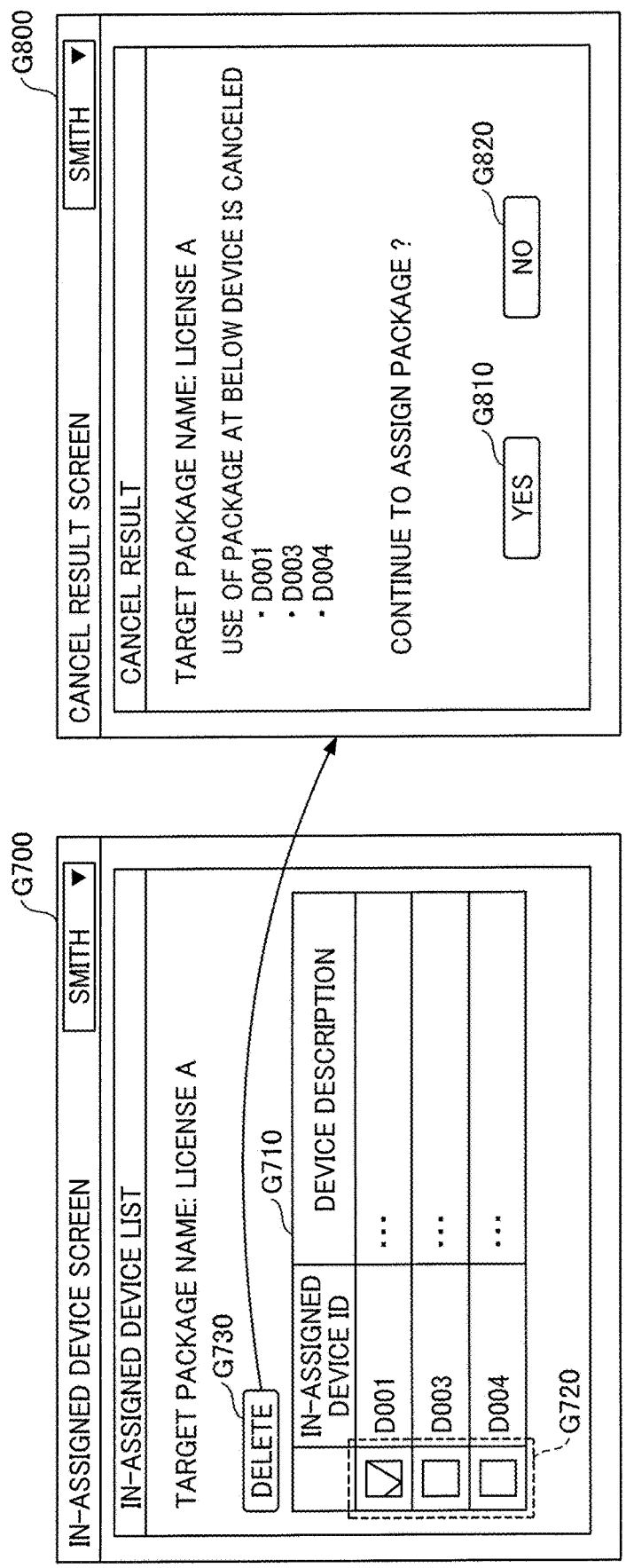
FIG. 19 illustrates an example of an in-assigned device screen and a cancel result screen.

When the generated in-assigned device screen is returned from the web service unit 101, the browser 210 displays, for example, an in-assigned device screen G700 illustrated in FIG. 19 (step S408).

As illustrated in FIG. 19, the in-assigned device screen G700 (fifth screen) includes, for example, an in-assigned device list display field G710 displaying the device ID of the device 30 assigned with the license indicated by the license information as a list of "in-assigned device ID." Further, the device list display field G710 also displays "device description." Further, the list of in-assigned device ID displayed in the in-assigned device list display field G710 is generated based on the in-assigned device list acquired in step S406.

Further, as illustrated in FIG. 19, the in-assigned device screen G700 includes, for example, a check box G720 for selecting an in-assigned device ID from the in-assigned device list display field G710.

The user can select the desired in-assigned device ID by selecting the check box G720 and then select a cancel button G730 to perform the selection operation of the to-be-canceled device (cancel target device). If the selection operation of the cancel target device is performed, among the licenses assigned to the device 30 identified by the selected in-assigned device ID, the concerned license indicated by the concerned license information can be cancelled from the device 30. With this configuration, for example, if the user wants to stop a use of a specific device 30 among the devices 30 assigned with a license of a particular package, the user can easily cancel the concerned license from the specific device 30.

Then, the browser 210 receives the selection operation of the cancel target device (step S409). At this timing, the user can also select a plurality of in-assigned device IDs by selecting the check box G720. In this case, after the sequence of steps S410 to S413 is executed for each of the selected in-assigned device IDs, the sequence of steps S414 to S415 is executed.

When the browser 210 receives the selection operation of the cancel target device, the browser 210 transmits a request for cancelling the package to the web service unit 101 (step S410). The package cancel request includes the device ID (in-assigned device ID) selected by selecting the check box G720, the tenant ID, and the service ID associated with the in-use package name selected on the package management screen G300 (FIG. 13).

In response to receiving the package cancel request, the web service unit 101 transmits the package cancel request to the device management unit 105 (step S411).

In response to receiving the package cancel request, the device management unit 105 transmits a license cancel request to the license management unit 104 (step S412). The license cancel request includes the device ID, the tenant ID, and the service ID.

In response to receiving the license cancel request, the license management unit 104 cancels the license identified by the tenant ID and the service ID among the license assigned to the device 30 identified by the device ID included in the license cancel request (step S413). That is, the license management unit 104 identifies the license information including the device ID, the tenant ID, and the service ID from the license information stored in the license information storage unit 160, and then deletes the device ID from the "in-use device ID" of with the identified license information. With this configuration, the license of the package associated with the service ID is cancelled from the device 30 selected by the user.

Then, the license management unit 104 returns a cancel result to the device management unit 105. Then, the device management unit 105 returns the cancel result, returned from the license management unit 104, to the web service unit 101.

When the cancel result is returned from the device management unit 105, the web service unit 101 generates a cancel result screen (step S414). Then, the web service unit 101 returns the generated cancel result screen to the browser 210.

When the cancel result screen is returned from the web service unit 101, the browser 210 displays, for example, a cancel result screen G800 illustrated in FIG. 19 (step S415).

As illustrated in FIG. 19, the cancel result screen G800 displays information indicating that the license corresponding to the in-use package name selected on the package management screen G300 (FIG. 13) is cancelled from the device ID of the device 30 selected on the in-assigned device screen G700 (FIG. 19). Further, the cancel result screen G800 (FIG. 19) includes, for example, "YES" button G810 and "NO" button G820 for selecting whether to continue the assignment of package.

If the "YES" button G810 is selected by the user, the browser 210 displays a screen (an assignable device screen G900 to be described later) used for assigning the license to the device 30. On the other hand, if the "NO" button G820 is selected by the user, the browser 210 displays the package management screen G300 (FIG. 13).

With this configuration, the user can cancel the license from the device 30 identified by the device ID selected in the in-assigned device screen G700 (FIG. 19) for the license of the in-use package name (license name) selected in the package management screen G300 (FIG. 13). Therefore, for example, if the user wants to cancel a license of a particular package from a specific device 30 alone, the user can easily cancel the license of the particular package assigned to the specific device 30 without a manual inputting operation of the license ID, the device ID, or the like.

The description is returned to FIG. 18. If the browser 210 receives the selection operation of the cancel button G330 in step S401, the browser 210 transmits a request for cancelling the package to the cloud server 10 (step S416). The package cancel request includes the service ID, and the tenant ID associated with the in-use package name selected by selecting the check box G320.

When the web service unit 101 receives the package cancel request, the web service unit 101 transmits the package cancel request to the license management unit 104 (step S417).

In response to receiving the package cancel request, the license management unit 104 cancels the license from the device 30 assigned with the license associated with to the service ID and the tenant ID included in the package cancel request (step S418). That is, the license management unit 104 identifies the license information including the service ID and the tenant ID from the license information stored in the license information storage unit 160, and then deletes all of the device IDs from the "in-use device ID" of the identified license information. With this configuration, the license assigned to the device 30 is cancelled from the device 30. Then, the license management unit 104 returns a cancel result to the web service unit 101.

When the cancel result is returned from the device management unit 105, the web service unit 101 generates a cancel result screen (step S419). Then, the web service unit 101 returns the generated cancel result screen to the browser 210.

When the cancel result screen is returned from the web service unit 101, the browser 210 displays, for example, the cancel result screen G800 illustrated in FIG. 19 (step S420).

With this configuration, the user can cancel the license from each one of the devices 30 assigned with the license of the in-use package name (license name) selected in the package management screen G300 (FIG. 13). Therefore, for example, if the user is to stop a use of a particular package, the user can easily and collectively cancel the license of the particular package assigned to each one of the devices 30, which are using the particular package, without a manual inputting operation of the license ID, the device ID, and the like.

Figure 20:
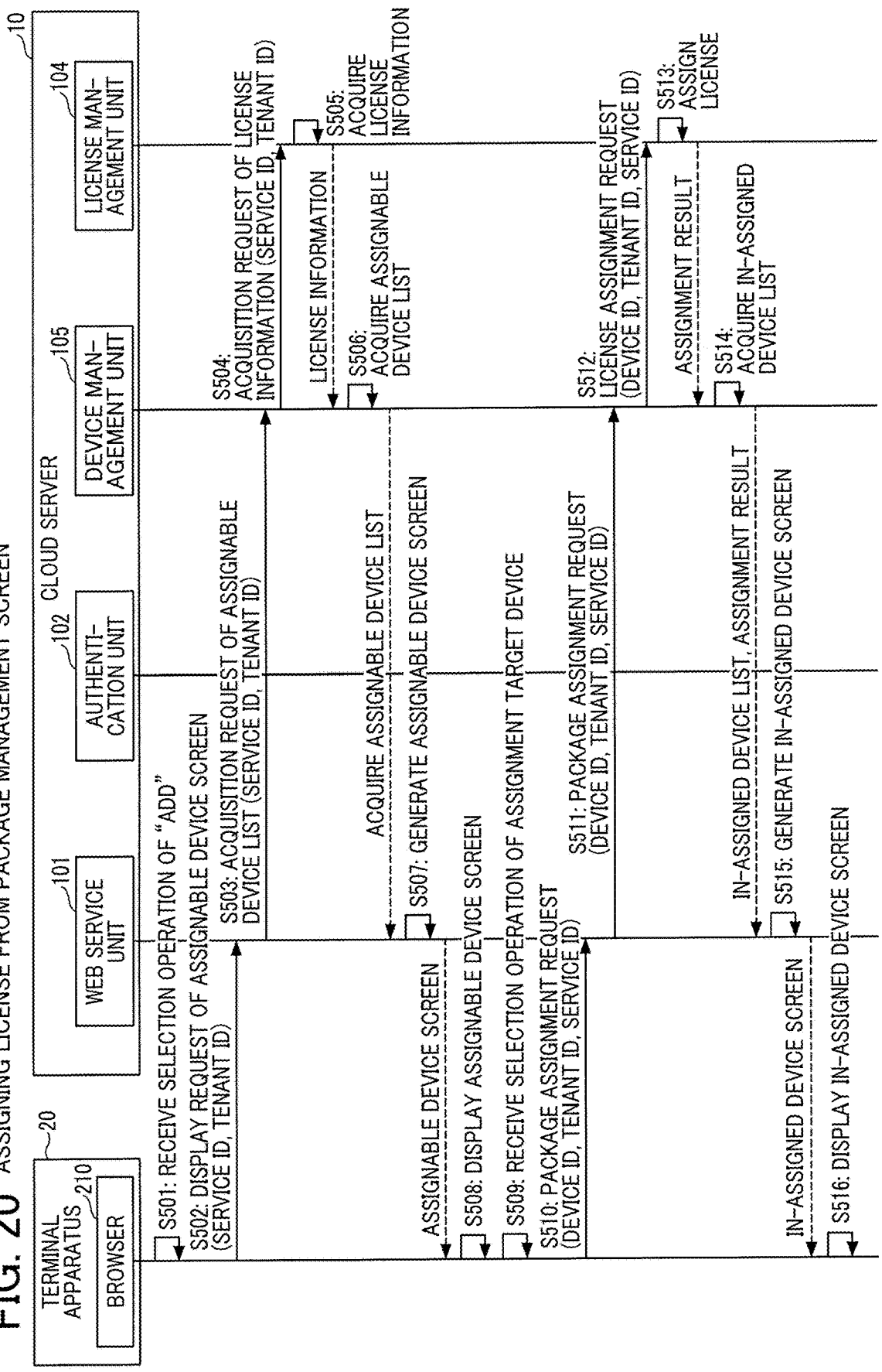
FIG. 20 illustrates an example of a sequence diagram of a process of assigning a license from a package management screen.

Process of Assigning License Via Package Management Screen:

Hereinafter, a description is given of a process of assigning a license from the package management screen G300 (FIG. 13) with reference to FIG. 20. FIG. 20 illustrates an example of a sequence diagram of a process of assigning the license from the package management screen G300.

At first, the browser 210 receives the selection operation of the add button G350 (step S501).

When the browser 210 receives the selection operation of the add button G350, the browser 210 transmits a request for displaying an assignable device screen to the cloud server 10 (step S502). The request for displaying the assignable device screen (the display request of the assignable device screen) includes the service ID corresponding to the selected add button G350 and the tenant ID. The service ID corresponding to the add button G350 is a service ID of the service information associated with the license information including the in-use package name (license name) corresponding to the add button G350.

In response to receiving the display request of the assignable device screen, the web service unit 101 transmits a request for acquiring an assignable device list to the device management unit 105 (step S503). The request for acquiring an assignable device list (the acquisition request of the assignable device list) includes the service ID and the tenant ID.

In response to receiving the acquisition request of the assignable device list, the device management unit 105 transmits a request for acquiring license information to the license management unit 104 (step S504). The request for acquiring license information (the acquisition request of the license information) includes the service ID and the tenant ID.

In response to receiving the acquisition request of the license information, the license management unit 104 acquires the license information being set with the service ID and the tenant ID included in the acquisition request of the license information from the license information storage unit 160 (step S505).

Then, the license management unit 104 transmits the acquired license information to the device management unit 105.

When the acquired license information is returned from the license management unit 104, the device management unit 105 acquires a list of device information of the device 30 that can be assigned with the license indicated by the acquired license information from the device information storage unit 170 (step S506). Hereinafter, the list of device information of the device 30 that can be assigned with the license may be also referred to as "assignable device list." That is, the device management unit 105 acquires the device information including the tenant ID and the device ID that is not yet set in the "in-use device ID" associated with the license information from the device information stored in the device information storage unit 170 as the assignable device list.

Then, the device management unit 105 returns the acquired assignable device list to the web service unit 101.

When the assignable device list is returned from the device management unit 105, the web service unit 101 generates an assignable device screen based on the assignable device list (step S507). Then, the web service unit 101 returns the generated assignable device screen to the browser 210.

Figure 21:
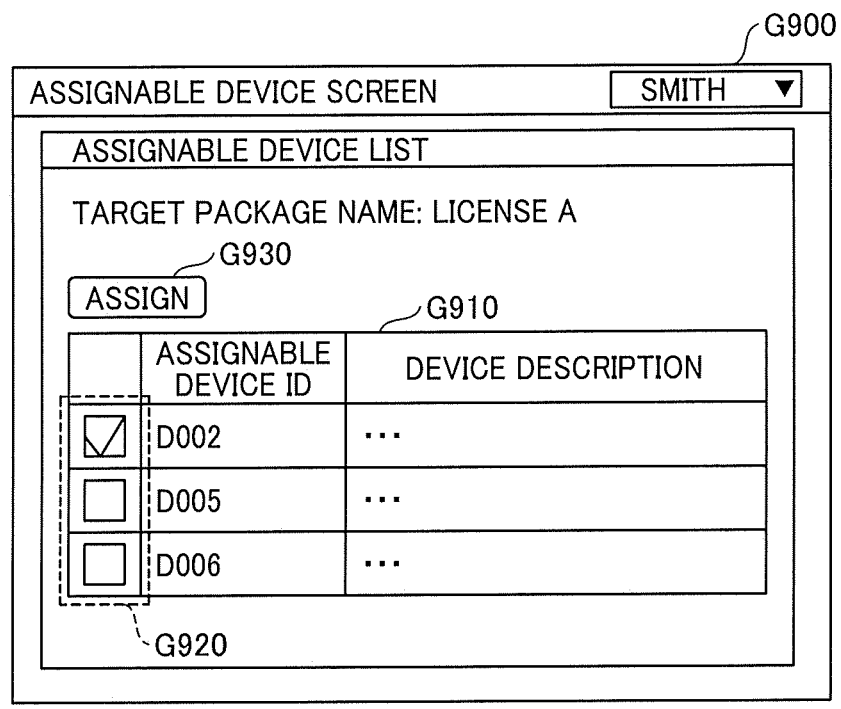
FIG. 21 illustrates an example of an assignable device screen.

When the assignable device screen is returned from the web service unit 101, the browser 210 displays, for example, an assignable device screen G900 illustrated in FIG. 21 (step S508).

As illustrated in FIG. 21, the assignable device screen G900 (sixth screen) includes, for example, an assignable device list display field G910 displaying the device ID of the device 30 that can be assigned with the license indicated by the license information (i.e., the device 30 not yet assigned with the license) as an "assignable device ID." The list of assignable device ID displayed in the assignable device list display field G910 is generated based on the assignable device list acquired in step S506.

When the user selects the desired assignable device ID by selecting the check box G920 and selects an assignment button G930, the user can assign the license to the device 30 identified by the selected assignable device ID. With this configuration, for example, if the user wants to use a particular package at a specific device 30, the user can assign the license of the particular package to the specific device 30. In the following description, it is assumed that the user selects the desired assignable device ID by selecting the check box G920 and performs the selection operation of the assignment button G930 (i.e., the selection operation of an assignment target device). At this timing, the user can also select a plurality of assignable device IDs by selecting the check box G920. In this case, after the sequence of steps S510 to S513 is executed for each of the selected assignable device IDs, the sequence of steps S514 to S516 is executed.

The browser 210 receives the selection operation of an assignment target device (step S509).

When the browser 210 receives the selection operation of the assignment target device, the browser 210 transmits a request for assigning a package to the web service unit 101 (step S510). The request for assigning the package (the package assignment request) includes the device ID (assignable device ID) selected by selecting the check box G920, the tenant ID, and the service ID associated with the in-use package name selected on the package management screen G300 (FIG. 13).

When the web service unit 101 receives the package assignment request, the web service unit 101 transmits the package assignment request to the device management unit 105 (step S511).

When the device management unit 105 receives the package assignment request, the device management unit 105 transmits a license assignment request to the license management unit 104 (step S512). The license assignment request includes the device ID, the tenant ID, and the service ID.

In response to receiving the license assignment request, the license management unit 104 assigns the license identified by the tenant ID and the service ID included in the license assignment request to the device 30 identified by the device ID included in the license assignment request (step S513). That is, the license management unit 104 identifies the license information including the tenant ID and the service ID from the license information stored in the license information storage unit 160, and then adds the device ID (the selected assignable device ID) to the "in-use device ID" of with the identified license information. With this configuration, the license can be assigned to the device 30 (i.e., the device 30 identified by the assignable device ID) selected by the user. Then, the license management unit 104 transmits an assignment result to the device management unit 105.

When the assignment result is returned from the license management unit 104, the device management unit 105 acquires an in-assigned device list from the device information storage unit 170 (step S514). Then, the device management unit 105 returns the acquired in-assigned device list and the assignment result to the web service unit 101.

When the in-assigned device list is returned from the device management unit 105, the web service unit 101 generates an in-assigned device screen based on the in-assigned device list (step S515). Then, the web service unit 101 returns the generated in-assigned device screen to the browser 210.

Further, the web service unit 101 can generate an assignment completion screen based on the assignment result returned from the device management unit 105 and then return the assignment completion screen to the browser 210. With this configuration, the browser 210 can display the assignment completion screen on the operation panel 22.

When the in-assigned device screen is returned from the web service unit 101, the browser 210 displays, for example, the in-assigned device screen G700 illustrated in FIG. 19 (step S516). However, in this case, the device list display field G710 of the in-assigned device screen G700 displays the device ID of the device 30 assigned with the license in step S513 in the list of the in-assigned device ID.

With this configuration, the user can assign the license of the in-use package name (license name) selected in the package management screen G300 (FIG. 13) to the device 30 identified by the device ID selected on the assignable device screen G900 (FIG. 21). Therefore, for example, if the user wants to use a particular package at a specific device 30 alone, the user can easily assign the license of the particular package to the specific device 30 without a manual inputting operation of the license ID, the device ID, or the like.

As to the above described embodiment, the license management can be performed with less workload.

Numerous additional modifications and variations are possible in light of the above teachings. It is therefore to be understood that, within the scope of the appended claims, the disclosure of this patent specification may be practiced otherwise than as specifically described herein.

Any one of the above-described operations may be performed in various other ways, for example, in an order different from the one described above.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An information processing apparatus connectable with a terminal via a network to manage a license of a package including a plurality of applications assignable to a device, the information processing apparatus comprising:
  circuitry configured to:
    generate screen information that displays a first screen on the terminal including a plurality of identification information corresponding to a plurality of packages, each identification information identifying a package available to a tenant, and a plurality of first buttons and a plurality of second buttons corresponding to the plurality of identification information, respectively;
    receive, on the first screen, a selection of operation of a first button or a second button corresponding to a specific package among the plurality of packages;
    generate screen information that displays a second screen on the terminal in a case that the operation of the first button is received, wherein the second screen includes a device list including, among devices corresponding to the identification information, one or more devices to which the license of the specific package is not assigned and not including one or more devices to which the license of the specific package is assigned;
    generate screen information that displays a third screen on the terminal in a case that the operation of the second button is received, wherein the third screen includes a device list including, among the devices corresponding to the identification information, one or more devices to which the license of the specific package is assigned and not including one or more devices to which the license of the specific package is not assigned;
    send the screen information that displays the second screen or the third screen to the terminal;
    receive, from the terminal, a selection of a specific device from the one or more devices included in the device list displayed on the second screen or the third screen;
    in a case where the selection of the specific device is received, assign the specific license of the particular package to the specific device selected from the device list in the case that the operation of the first button was received in the case that the specific license of the particular package has not been assigned to the specific device; and
    cancel the specific license of the particular package from the specific device selected from the device list in the case that the operation of the second button was received.

2. The information processing apparatus according to claim 1,
  wherein the circuitry is further configured to:
    store the license information of the specific license of the particular package in a license information storage unit;
  wherein the license information comprises an upper limit number of devices which use an application included in the purchased package, and in-use device identification information identifying one or more devices which use the application included in the purchased package.

3. The information processing apparatus according to claim 2,
wherein the information processing apparatus further comprises a device information storage unit for storing device information including device identification information in association with the identification information; and
wherein acquiring, based on the license information, a device list of one or more devices corresponding to the identification information comprises:
acquiring as the device list, from the device information storage unit, device information corresponding to the identification information, and corresponding to device identification information that is not set in the in-use device identification information included in the license information.

4. The information processing apparatus according to claim 1,
wherein the circuitry is further configured to:
in a case where a second request from the terminal is received, acquire an in-use package list including one or more packages assignable to the selected specific device;
receive, from the terminal, a first selection of a specific package from one or more packages included in the in-use package list;
wherein, in a case where the first selection of a specific package, the selection of the specific device from the one or more devices included in the device list and the operation of assigning the specific license of the package are received, the circuitry assigns the license of the selected specific package to the selected specific device.

5. The information processing apparatus according to claim 4,
wherein the circuitry is further configured to:
display, on the terminal, a fourth screen for displaying the in-use package list,
and receiving a first selection of a specific package comprises receiving the selection of the particular package from the in-use package list displayed on the fourth screen.

6. The information processing apparatus according to claim 1,
wherein the circuitry is further configured to:
in a case where a second request is received from the terminal,
acquire an in-use package list including one or more packages cancellable from the selected specific device;
receive, from the terminal, a first selection of a specific package from one or more packages included in the in-use package list;
in a case where the selection of the specific package from the in-use package list and an operation of cancelling of the license of the specific package from a part of the devices currently assigned with the specific package from the terminal are received,
acquire an in-assigned device list, from which the license of the selected specific package is cancellable.

7. The information processing apparatus according to claim 6,
wherein the circuitry is further configured to:
display, on the terminal, a fourth screen for displaying the in-use package list; and
display, on the terminal, a fifth screen for displaying the in-assigned device list,
wherein receiving the first selection of a specific package comprises receiving a selection of a particular package from the in-use package list displayed on the fourth screen, and receiving the selection of the specific device from the in-assigned device list comprises receiving the selection of the specific device from the in-assigned device list displayed on the fifth screen.

8. The information processing apparatus according to claim 6,
wherein the circuitry is further configured to:
store the license information of the specific license of the package in a license information storage unit; and
in a case where a second request is received from the terminal, acquire from the license information storage unit a list of license information corresponding to the tenant identification information included in a login information as the in-use package list.

9. The information processing apparatus according to claim 1,
wherein the circuitry is further configured, in a case where a second request is received from the terminal, to display on the terminal, a fourth screen for displaying an in-use package list including one or more packages assignable to the selected specific device or cancellable from the selected specific device,
wherein the first screen includes a plurality of first items for assigning each of the licenses of the package to each of the devices;
and wherein the circuitry is further configured to receive, from the terminal, an item selection of a first item from among the plurality of the first items, the selected first item corresponding to a specific license of the package from the one or more licenses of the package included in the in-use package list displayed on the first screen.

10. The information processing apparatus according to claim 1, wherein the circuitry is further configured to:
receive an operation of assigning a license of the selected particular package to the specific device from the terminal; and
assign the specific license of the package to the specific device selected from the device list in a case where the selection of the specific device and the operation of assigning the license of the particular package are received.

11. An information processing system for managing a license of a package including one or more applications assignable to a device connectable with a terminal via a network, the information processing system comprising:
an information processing apparatus according to claim 1;
the terminal; and
the device.

12. A method of managing a license of a package including a plurality of applications assignable to a device connectable with a terminal via a network, the method comprising:
generating screen information that displays a first screen on the terminal including a plurality of identification information corresponding to a plurality of packages, each identification information identifying a package available to a tenant, and a plurality of first buttons and a plurality of second buttons corresponding to the plurality of identification information, respectively;
receiving, on the first screen, a selection of operation of a first button or a second button corresponding to a specific package among the plurality of packages;
generating screen information that displays a second screen on the terminal in a case that the operation of the first button is received, wherein the second screen includes a device list including, among devices corresponding to the identification information, one or more devices to which the license of the specific package is not assigned and not including one or more devices to which the license of the specific package is assigned;

generating screen information that displays a third screen on the terminal in a case that the operation of the second button is received, wherein the third screen includes a device list including, among the devices corresponding to the identification information, one or more devices to which the license of the specific package is assigned and not including one or more devices to which the license of the specific package is not assigned;

sending the screen information that displays the second screen or the third screen to the terminal;

receiving, from the terminal, a selection of a specific device from the one or more devices included in the device list displayed on the second screen or the third screen and an operation of assigning or cancelling the specific license of the particular package;

assigning the specific license of the particular package to the specific device selected from the device list in the case that the operation of the first button was received in the case that the specific license of the particular package has not been assigned to the specific device; and cancelling the specific license of the particular package from the specific device selected from the device list in the case that the operation of the second button was received in the case that the specific license of the particular package has been assigned to the specific device.

13. A non-transitory recording medium storing a plurality of program codes which, when executed by one or more processors, causes the processors to perform a method, the method comprising:

generating screen information that displays a first screen on the terminal including a plurality of identification information corresponding to a plurality of packages, each ef which identification information identifying a package available to a tenant, and a plurality of first buttons and a plurality of second buttons corresponding to the plurality of identification information, respectively;

receiving, on the first screen, a selection of operation of a first button or a second button corresponding to a specific package among the plurality of packages;

generating screen information that displays a second screen on the terminal in a case that the operation of the first button is received, wherein the second screen includes a device list including, among devices corresponding to the identification information, one or more devices to which the license of the specific package is not assigned and not including one or more devices to which the license of the specific package is assigned;

generating screen information that displays a third screen on the terminal in a case that the operation of the second button is received, wherein the third screen includes a device list including, among the devices corresponding to the identification information, one or more devices to which the license of the specific package is assigned and not including one or more devices to which the license of the specific package is not assigned;

sending the screen information that displays the second screen or the third screen to the terminal;

receiving, from the terminal, a selection of a specific device from the one or more devices included in the device list displayed on the second screen or the third screen and an operation of assigning or cancelling the specific license of the particular package;

assigning the specific license of the particular package to the specific device selected from the device list in the case that the operation of the first button was received in the case that the specific license of the particular package has not been assigned to the specific device; and cancelling the specific license of the particular package from the specific device selected from the device list in the case that the operation of the second button was received in the case that the specific license of the particular package has been assigned to the specific device.

14. The information processing apparatus according to claim 1, wherein the circuitry is further configured to:

identify one or more first devices among the one or more devices corresponding to the identification information to which the license for the particular package has not been assigned;

identify one or more second devices among the one or more devices corresponding to the identification information that has been assigned the license for the particular package;

assign the license to the selected specific device among the one or more first devices; and cancel the license from the selected specific device among the one or more second devices.

* * * * *